(12) United States Patent
Hashimoto

(10) Patent No.: US 9,146,442 B2
(45) Date of Patent: Sep. 29, 2015

(54) MACH-ZEHNDER INTERFEROMETER TYPE OPTICAL MODULATOR

(71) Applicant: SUMITOMO ELECTRIC INDUSTRIES, LTD., Osaka-shi, Osaka (JP)

(72) Inventor: Jun-ichi Hashimoto, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/481,498

(22) Filed: Sep. 9, 2014

(65) Prior Publication Data

US 2014/0376853 A1    Dec. 25, 2014

Related U.S. Application Data

(62) Division of application No. 13/038,895, filed on Mar. 2, 2011, now abandoned.

(30) Foreign Application Priority Data

Apr. 1, 2010   (JP) ................. 2010-085243

(51) Int. Cl.
*G02F 1/035* (2006.01)
*G02F 1/225* (2006.01)
*G02F 1/21* (2006.01)

(52) U.S. Cl.
CPC ............... *G02F 1/225* (2013.01); *G02F 1/035* (2013.01); *G02F 2001/212* (2013.01); *G02F 2201/17* (2013.01); *G02F 2201/34* (2013.01)

(58) Field of Classification Search
None
See application file for complete search history.

(56) References Cited

U.S. PATENT DOCUMENTS

| 5,754,714 | A  | 5/1998  | Suzuki et al. |
| 6,954,568 | B2 | 10/2005 | Liu |

(Continued)

FOREIGN PATENT DOCUMENTS

| JP | 62-183406   | 8/1987 |
| JP | 2004-133407 | 4/2004 |

(Continued)

OTHER PUBLICATIONS

C. Rolland et al., "10 Gbit/s, 1.56μ Multiquantum Well InP/InGaAsP Mach-Zehnder Optical Modulator", Electronics Letters, vol. 29, No. 5, Mar. 4, pp. 471-472, 1993.

(Continued)

*Primary Examiner* — Hemang Sanghavi
(74) *Attorney, Agent, or Firm* — Smith, Gambrell & Russell, LLP

(57) ABSTRACT

A Mach-Zehnder interferometer type optical modulator includes a first end facet and a reflecting portion opposing the first end facet; a single optical coupler including input and output ports, the optical coupler being disposed between the first end facet and the reflecting portion; first and second optical waveguides that are connected to the input ports of the optical coupler; third and fourth optical waveguides that are connected to the output ports of the optical coupler; and a phase shifting section disposed between the optical coupler and the reflecting portion. The phase shifting section includes a first optical waveguide structure constituting part of the third optical waveguide; a first upper electrode on the first optical waveguide structure; a second optical waveguide structure constituting part of the fourth optical waveguide; and a second upper electrode on the second optical waveguide structure.

8 Claims, 18 Drawing Sheets

(56) References Cited

U.S. PATENT DOCUMENTS

| | | |
|---|---|---|
| 8,401,399 B2 | 3/2013 | Barton et al. |
| 2004/0156589 A1* | 8/2004 | Gunn et al. ............ 385/37 |
| 2010/0142885 A1 | 6/2010 | Shinoda et al. |
| 2010/0142889 A1 | 6/2010 | Kwon et al. |
| 2011/0235961 A1 | 9/2011 | Hashimoto |
| 2011/0235971 A1 | 9/2011 | Hashimoto |
| 2011/0267676 A1 | 11/2011 | Dallesasse et al. |

FOREIGN PATENT DOCUMENTS

| | | |
|---|---|---|
| JP | 2004-287116 A | 10/2004 |
| JP | 2005-99387 | 4/2005 |
| JP | 2011-164612 | 8/2011 |

OTHER PUBLICATIONS

Notification of Reasons of Rejection ( English translation provided) from the Japanese Patent Office, dated Nov. 5, 2013.

* cited by examiner

US 9,146,442 B2

MACH-ZEHNDER INTERFEROMETER TYPE OPTICAL MODULATOR

CROSS REFERENCE TO RELATED APPLICATION

This application is a division of U.S. Ser. No. 13/038,895 filed Mar. 2, 2011, which claims priority to Japanese Application No. 2010-085243, filed Apr. 1, 2010, which are being incorporated entirely herein by reference.

BACKGROUND OF THE INVENTION

1. Field of the Invention

The present invention relates to Mach-Zehnder interferometer type optical modulators.

2. Description of the Related Art

Patent Document 1 (Japanese Unexamined Patent Application Publication No. 62-183406) describes a waveguide-type optical interferometer. This waveguide-type optical interferometer includes a substrate, two optical guides composed of glass or a plastic formed on the substrate, two optical couplers that connect the optical waveguides to each other at different positions, and phase shifters disposed in the optical waveguides between the optical couplers. Each phase shifter includes a heater disposed on the optical waveguide. The optical path length of the optical waveguide is changed by controlling the temperature of the optical waveguide by heating the heater of the phase shifter.

In recent years, optical modulators that modulate light in response to electric signals from outside have become one of the essential components in configuring optical fiber communication systems and optical information processing systems. In particular, a Mach-Zehnder interferometer type optical modulator that uses a waveguide-type optical interferometer described in Patent Document 1 enables high-speed modulation of 40 Gbps or higher. Since Mach-Zehnder interferometer type optical modulators have a low wavelength chirp under high-speed modulation, Mach-Zehnder interferometer type optical modulators can be used for future ultra high-speed, high-capacity optical communication systems. In particular, Mach-Zehnder interferometer type optical modulators composed of semiconductors are small in size, have low power consumption, and can be monolithically integrated with other semiconductor optical devices such as a laser diode through to achieve wider versatility.

A Mach-Zehnder interferometer type optical modulator has an optical waveguide structure constituted by an upper cladding layer, a lower cladding layer, and a core layer between these cladding layers. The core layer is composed of a material having a refractive index higher than those of the upper cladding layer and the lower cladding layer. In particular, an optical waveguide structure of a semiconductor optical device has a pin structure in which one of the upper and lower cladding layers is composed of an n-type semiconductor, the other of the upper and lower cladding layers is composed of a p-type semiconductor, and the core layer is composed of an undoped semiconductor.

FIGS. 17, 18A and 18B show a Mach-Zehnder interferometer type optical modulator 100 having a pin structure. FIG. 17 is a plan view of the Mach-Zehnder interferometer type optical modulator 100. FIG. 18A is a cross-sectional view taken along line XVIIIa-XVIIIa in FIG. 17. FIG. 18B is a cross-sectional view taken along line XVIIIb-XVIIIb in FIG. 17.

As shown in FIG. 17, the Mach-Zehnder interferometer type optical modulator 100 includes a phase shifting section 110, an input optical coupler 120, an output optical coupler 130, and six optical waveguides 140a, 140b, 140c, 150a, 150b, and 150c. These components are formed on an n-type semiconductor substrate 101 (refer to FIGS. 18A and 18B). Each of the waveguides 140b and 150b has one end connected to the input optical coupler 120 and the other end connected to the output optical coupler 130. The phase shifting section 110 is interposed between the input optical coupler 120 and the output optical coupler 130. Upper electrodes 111a and 111b are respectively disposed on the optical waveguides 140b and 150b in the phase shifting section 110.

The optical waveguides 140a and 150a each extend from one end 100a of the Mach-Zehnder interferometer type optical modulator 100 to the input optical coupler 120. The optical waveguides 140c and 150c each extend from output optical coupler 130 to the other end 100b of the Mach-Zehnder interferometer type optical modulator 100.

Referring now to FIGS. 18A and 18B, the Mach-Zehnder interferometer type optical modulator 100 includes an n-type lower cladding layer 103, core layers 104a and 104b, p-type upper cladding layers 105a and 105b, and p-type contact layers 106a and 106b. The core layer 104a is interposed between the n-type lower cladding layer 103 and the p-type upper cladding layer 105a. The core layer 104b is interposed between the n-type lower cladding layer 103 and the p-type upper cladding layer 105b. The p-type contact layers 106a and 106b are disposed on the p-type upper cladding layers 105a and 105b, respectively. The upper electrodes 111a and 111b are disposed on the p-type contact layers 106a and 106b, respectively. A cathode electrode 112 is formed on the back of the n-type semiconductor substrate 101.

A part of the n-type lower cladding layer 103, the core layer 104a, the p-type upper cladding layer 105a, and the p-type contact layer 106a form a mesa structure 107a. The mesa structure 107a constitutes the optical waveguide 140b. Similarly, another part of the n-type lower cladding layer 103, the core layer 104b, the p-type upper cladding layer 105b, and the p-type contact layer 106b form another mesa structure 107b. The mesa structure 107b constitutes the optical waveguide 150b. Side surfaces of the mesa structures 107a and 107b are buried by, for example, a polyimide resin 108.

According to the Mach-Zehnder interferometer type optical modulator 100, the refractive indices of the core layers 104a and 104b can be changed by applying a reverse bias voltage between the cathode electrode 112 and the upper electrodes 111a and 111b. As a result, the phase of the light guided in the core layers 104a and 104b can be shifted.

SUMMARY OF THE INVENTION

As shown in FIG. 17, the device length L in the waveguiding direction of the Mach-Zehnder interferometer type optical modulator 100 is the length from the end 100a to the end 100b of the Mach-Zehnder interferometer type optical modulator 100. The device length L in the waveguiding direction is relatively large, e.g., 3 mm to 5 mm. Therefore, it is difficult to install the Mach-Zehnder interferometer type optical modulator 100 in a small-size optical module.

A first aspect of the present invention provides a Mach-Zehnder interferometer type optical modulator including a first end facet and a reflecting portion opposing the first end facet; a single optical coupler including input ports and output ports, the optical coupler being disposed between the first end facet and the reflecting portion; a first optical waveguide and a second optical waveguide that extend from the first end facet and are connected to the input ports of the optical coupler a third optical waveguide and a fourth optical waveguide that extend from the reflecting portion and are connected to the output ports of the optical coupler, and a phase shifting section that controls a phase of light propagating in at least one of the third and fourth optical waveguides, the phase shifting section being disposed between the optical coupler and the reflecting portion. The phase shifting section includes a first optical waveguide structure constituting part of the third optical waveguide; a first upper electrode on the first optical waveguide structure; a second optical waveguide structure constituting part of the fourth optical waveguide; and a second upper electrode on the second optical waveguide structure.

According to this Mach-Zehnder interferometer type optical modulator, the first and second optical waveguides extend from the first end facet and are connected to the input ports of the optical coupler. Meanwhile, the third and fourth optical waveguides that extend from the reflecting portion and are connected to the output ports of the optical coupler are also provided. Incoming light enters from the first-end facet-side of the first or second optical waveguide, propagates through the optical coupler and the third and fourth optical waveguides, and is reflected by the reflecting portion so as to again propagate in the third and fourth optical waveguides. The Mach-Zehnder interferometer type optical modulator also includes the phase shifting section. The phase shifting section includes the first and second optical waveguide structures respectively constituting part of the third and fourth optical waveguides. Since the first and second upper electrodes are respectively disposed on the first and second optical waveguide structures, the phase of light guided in at least one of the third and fourth optical waveguides can be controlled by applying a modulated signal (for example, modulated voltage) to the first or second upper electrode. Lights propagating in the third and fourth optical waveguides from the phase shifting section enter the output ports of the optical coupler. Modulated light according to the modulated signal can be output from the first-end facet-side of the first or second optical waveguide through the optical coupler. A conventional Mach-Zehnder interferometer type optical modulator shown in FIG. 17, 18A or 18B has at least two optical couplers of the input optical coupler 120 and the output optical coupler 130. On the other hand, this Mach-Zehnder interferometer type optical modulator has a single optical coupler. Thus, the Mach-Zehnder interferometer type optical modulator can be operated by using only the left half of the region of the conventional Mach-Zehnder interferometer type optical modulator shown in FIG. 17, 18A or 18B. Accordingly, the device length in the waveguiding direction can be shortened. Thus, the Mach-Zehnder interferometer type optical modulator can be easily mounted in a small-size optical module.

In the Mach-Zehnder interferometer type optical modulator according to the present invention, preferably the first optical waveguide structure in the phase shifting section may include a first lower cladding layer, a first core layer and a first upper cladding layer. Furthermore, the second optical waveguide structure in the phase shifting section includes a second lower cladding layer, a second core layer and a second upper cladding layer. The first upper electrode is disposed on the first upper cladding layer of the first optical waveguide structure, and the second upper electrode is disposed on the second upper cladding layer of the second optical waveguide structure. Light propagating in the first optical waveguide structure is confined in the first core layer sandwiched between the first lower cladding layer and the first upper cladding layer. Similarly, light propagating in the second optical waveguide structure is confined in the second core layer sandwiched between the second lower cladding layer and the second upper cladding layer. A phase of guided light in the first or second optical waveguide structures can be changed by changing a refractive index of at least one of the first and second core layers according to applying a modulated signal to the first or second upper electrodes.

In the Mach-Zehnder interferometer type optical modulator according to the present invention, preferably the optical coupler may be a multimode interference coupler including two input ports and two output ports which are a through port and a cross port, respectively. The optical coupler may be configured so that a phase of guided light propagating from one of the input ports to the cross port is delayed by $\pi/2$ with respect to a phase of guided light propagating from the input port to the through port.

According to the Mach-Zehnder interferometer type optical modulator, the phase difference is generated between light guided in the third optical waveguide and light guided in the fourth optical waveguide by applying a modulated signal to the upper electrode of the phase shifting section. Moreover, the optical coupler is configured so that a phase difference of $\pi/2$ is generated between the light propagating from the input port of the optical coupler to the through port, i.e., the output port, and the light propagating from the in put port of the optical coupler to the cross port. Both the phase difference between light guided in the third optical waveguide and light guided in the fourth optical waveguide in the phase shifting section and the phase difference generated as a result of propagation in the optical coupler are utilized. As a result, the continuous wave (CW) light input to one of the input ports of the optical coupler is modulated by the modulated signal and output from the other input port as a modulated signal light.

The Mach-Zehnder interferometer type optical modulator may further include a phase adjusting section that adjusts a phase of light propagating in at least one of the third and fourth optical waveguides independently from the phase shifting section, the phase adjusting section being disposed between the phase shifting section and the optical coupler. The phase adjusting section may include a third optical waveguide structure constituting part of the third optical waveguide; a third upper electrode disposed on the third optical waveguide structure; a fourth optical waveguide structure constituting part of the fourth optical waveguide; and a fourth upper electrode disposed on the fourth optical waveguide structure.

The guided light beams that have propagated through the third and fourth optical waveguides and have been reflected by the reflecting portion may have different reflective characteristics due to the error that occurs during the device production. The difference in phase shift amount occurs at the reflecting portion due to such a difference in reflective characteristics. The difference in phase shift amount differs from one device to another. As a result, the optimum value of modulated signal (for example, modulated voltage) applied to the phase shifting section differs from one device to another, and it becomes difficult to ensure stable operation and reproduction of the device characteristics. To address this issue, the Mach-Zehnder interferometer type optical modulator may further include a phase adjusting section configured to adjust a phase of light by adjusting the refractive index of at least one of the third and fourth optical waveguides independently from the phase shifting section. The difference in phase shift amount at the reflecting portion can be compensated by adjusting a phase of guided light through the phase adjusting section. Thus, the optimum value of the modulated signal applying to the phase shifting section can be easily maintained substantially constant. The stable operation and reproduction of device characteristics can thus be easily achieved.

In the Mach-Zehnder interferometer type optical modulator according to the present invention, preferably the reflecting portion may include a plurality of distributed Bragg reflectors. The distributed Bragg reflectors may include a fifth optical waveguide structure and a sixth optical waveguide structure that constitute part of the third and fourth optical waveguides, respectively, the fifth and sixth optical waveguide structures each including a core layer in which a diffraction grating having periodic projections and recesses is formed.

The Mach-Zehnder interferometer type optical modulator may further include a plurality of monitoring portions respectively connected to the distributed Bragg reflectors. The monitoring portions may include photo-receiving elements that convert light output from the distributed Bragg reflectors into electrical signals.

In the Mach-Zehnder interferometer type optical modulator according to the present invention, preferably the reflecting portion may include a plurality of distributed Bragg reflectors optically connected to the third and fourth optical waveguides. The distributed Bragg reflectors may each include a diffraction grating structure including a plurality of semiconductor portions and a plurality of dielectric portions periodically and alternately arranged in a waveguiding direction. Since the difference in refractive index between semiconductors and dielectric materials is generally great, the reflecting portion of the Mach-Zehnder interferometer type optical modulator will have a higher reflectivity than that of the reflection portion having distributed Bragg reflectors composed of semiconductor materials.

In the Mach-Zehnder interferometer type optical modulator according to the present invention, preferably the plurality of semiconductor portions of the distributed Bragg reflectors may be integrally formed across the distributed Bragg reflectors. Furthermore, the plurality of dielectric portions of the distributed Bragg reflectors may be composed of benzocyclobutene resin or polyimide resin. In the Mach-Zehnder interferometer type optical modulator according to the present invention, preferably the reflecting portion may include a plurality of distributed Bragg reflectors optically connected to the third and fourth optical waveguides. The distributed Bragg reflectors may each have a diffraction grating structure including a plurality of semiconductor portions and a plurality of air gaps that are alternately and periodically arranged in a waveguiding direction. The difference in refractive index between semiconductors and air is greater than that between semiconductors and dielectric materials. Thus, according to the Mach-Zehnder interferometer type optical modulator including such distributed Bragg reflectors, the reflecting portion achieves a high reflectivity.

In the Mach-Zehnder interferometer type optical modulator according to the present invention, preferably the reflecting portion may be a second end facet that opposes the first end facet and has a high-reflection film formed thereon.

In the Mach-Zehnder interferometer type optical modulator according to the present invention, preferably the phase shifting section is disposed apart from the second end facet by a predetermined gap. The second end facet is, for example, formed by cleaving. When the second end facet is terminated with the phase shifting section including the upper electrode, the electrode material near the second end facet may adhere on the second end facet during cleavage. However, according to this Mach-Zehnder interferometer type optical modulator, the second end facet is terminated with the waveguiding section not having an upper electrode and no electrode material is present near the second end facet. Therefore, adhesion of the electrode on the end facet can be suppressed.

In the Mach-Zehnder interferometer type optical modulator according to the present invention, preferably the first end facet may include an anti-reflection film formed thereon.

According to the Mach-Zehnder interferometer type optical modulator, since the anti-reflection film is formed on the first end facet that transmits light, reflection of incoming light and outgoing light by the first end facet can be suppressed. Moreover, the anti-reflection film suppresses degradation of the optical coupling efficiency between the Mach-Zehnder interferometer type optical modulator and optical fibers connected to the Mach-Zehnder interferometer type optical modulator. Since the anti-reflection film is provided, outgoing light can be suppressed from being reflected by the first end facet and returning to the interior of the modulator. Accordingly, the adverse effects on the modulation operation of the modulator can be diminished.

DESCRIPTION OF THE PREFERRED EMBODIMENTS

Figure 1:
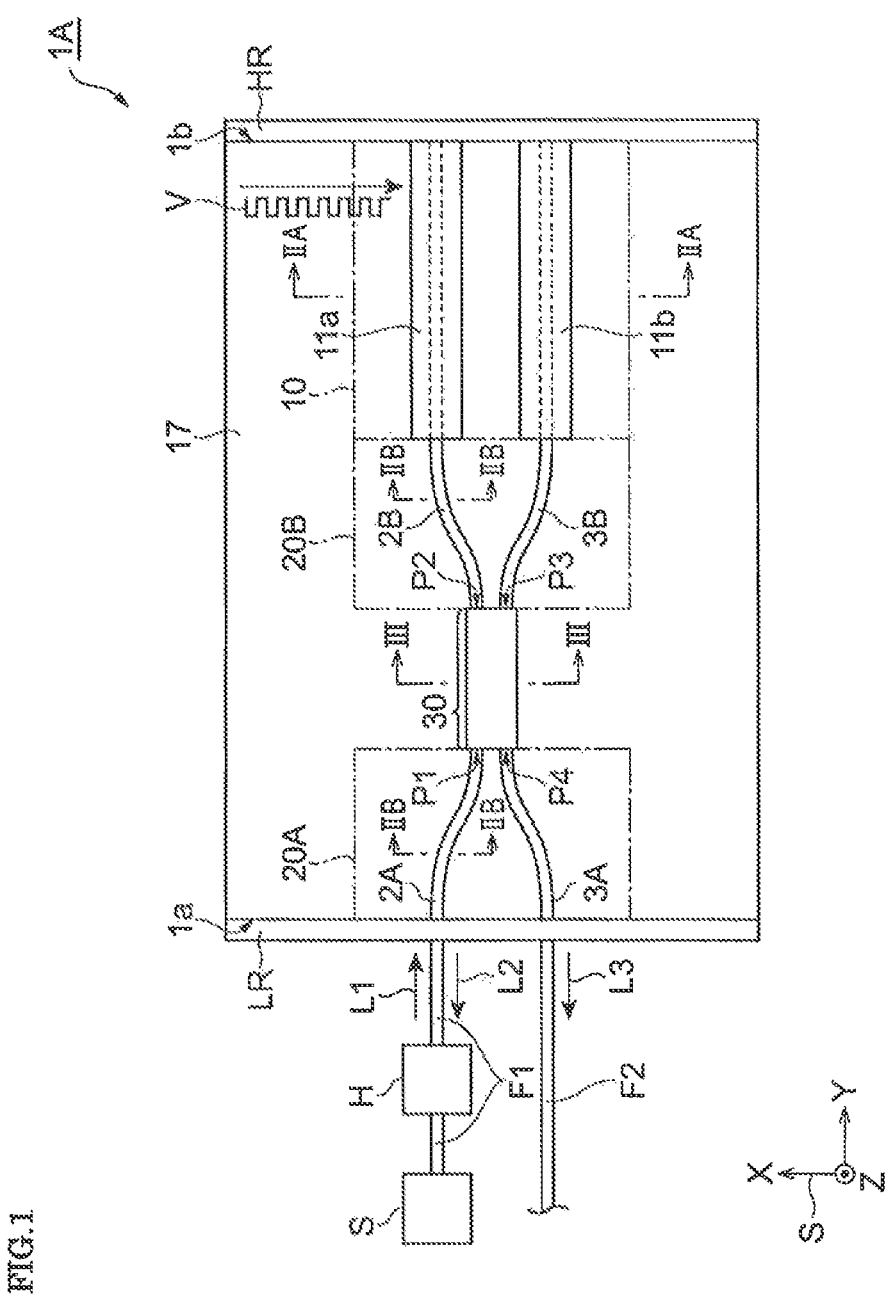
FIG. 1 is a plan view showing an example of a Mach-Zehnder interferometer.

Embodiments of the Mach-Zehnder interferometer type optical modulator of the present invention will now be described in detail with reference to the attached drawings. In the description of the drawings, the same components are given the same reference numerals and the description therefor is omitted to avoid redundancy.

First Embodiment

FIG. 1 is a plan view showing an example of a Mach-Zehnder interferometer type optical modulator. Referring to FIG. 1, a Mach-Zehnder interferometer type optical modulator 1A of this embodiment has a first end facet 1a that transmits light and a second end facet 1b that reflects light. The second end facet 1b is the reflecting portion of this embodiment. For example, a high-reflection film HR is formed on the second end facet 1b.

Figure 2A:
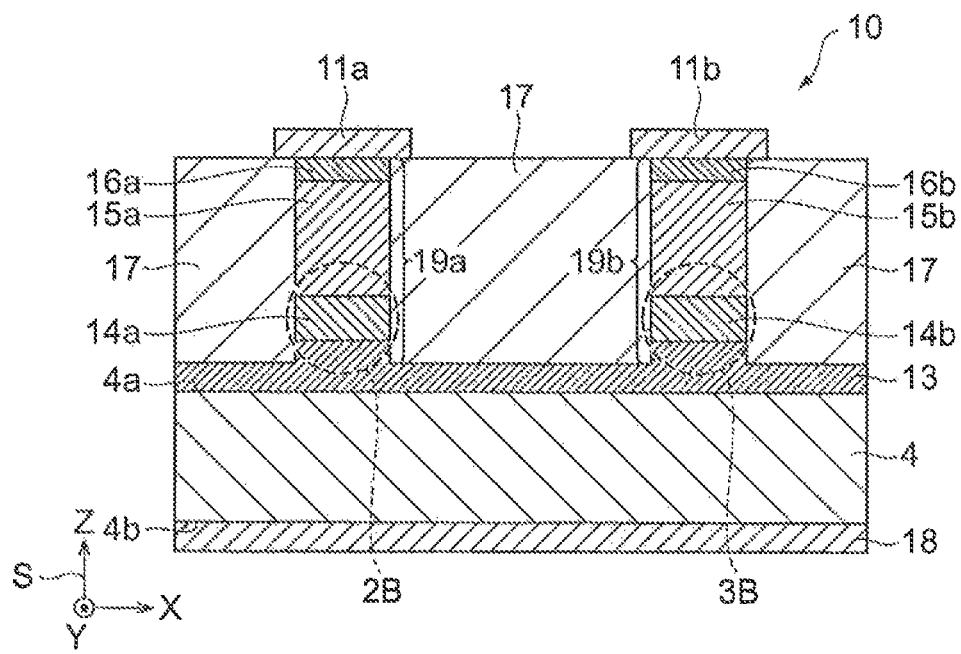
FIG. 2A is a cross-sectional view of the Mach-Zehnder interferometer type optical modulator shown in FIG. 1 taken along line IIA-IIA.
Figure 2B:
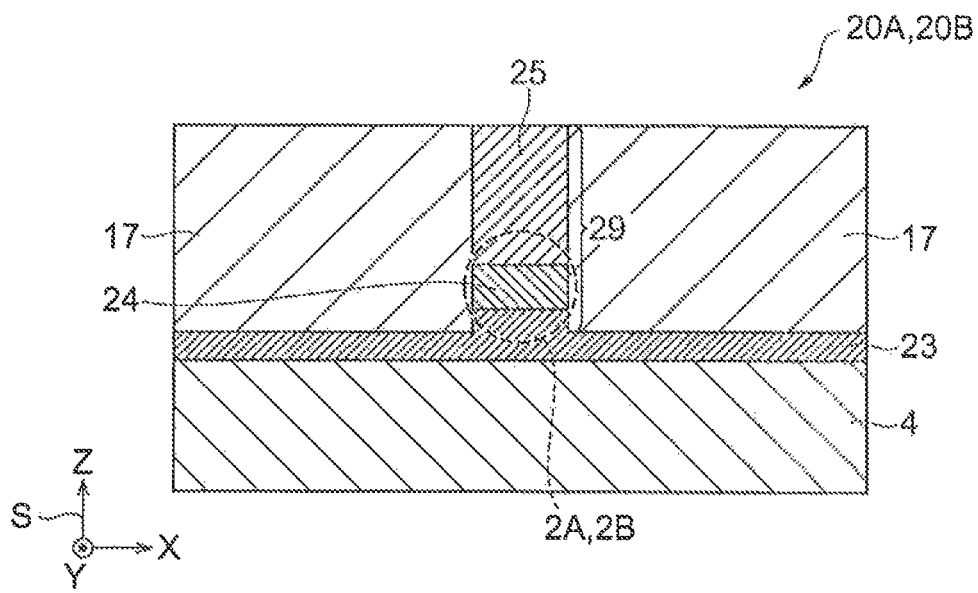
FIG. 2B is a cross-sectional view of the Mach-Zehnder interferometer type optical modulator shown in FIG. 1 taken along line IIB-IIB.
Figure 3:
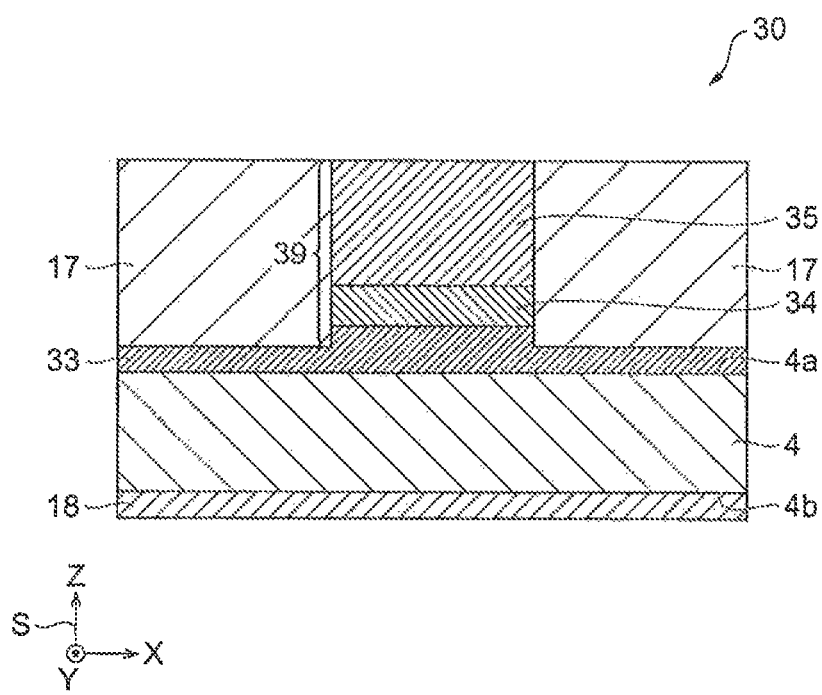
FIG. 3 is a cross-sectional view of the Mach-Zehnder interferometer type optical modulator shown in FIG. 1 taken along line III-III.

The Mach-Zehnder interferometer type optical modulator 1A of this embodiment includes a phase shifting section 10, waveguiding sections 20A and 20B, and an optical coupler 30. The optical coupler 30 is disposed between the waveguiding section 20A and the waveguiding section 20B. The waveguiding section 20B is disposed between the optical coupler 30 and the phase shifting section 10. The phase shifting section 10, the waveguiding sections 20A and 20B, and the optical coupler 30 are formed on an n-type semiconductor substrate 4 as shown in FIGS. 2A, 2B and 3. An n-type InP substrate can be used as the n-type semiconductor substrate 4, for example.

The Mach-Zehnder interferometer type optical modulator 1A includes four optical waveguides 2A, 2B, 3A and 3B. According to this embodiment, the optical waveguide 2A is a first optical waveguide, the optical waveguide 3A is a second optical waveguide, the optical waveguide 2B is a third optical waveguide and the optical waveguide 3B is a fourth optical waveguide.

The optical waveguides 2A and 3A are formed on the semiconductor substrate 4. The optical waveguides 2A and 3A extend from the first end facet 1a to the optical coupler 30. The optical waveguides 2A and 3A are disposed in the waveguiding section 20A. The optical waveguides 2A and 3A are provided in parallel with each other in an extending direction. The optical waveguides 2B and 3B are formed on the semiconductor substrate 4. The optical waveguides 2B and 3B and extend from the optical coupler 30 to the second end facet 1b. The optical waveguides 2B and 3B extend across the waveguiding section 20B and the phase shifting section 10. The optical waveguides 2B and 3B are provided in parallel with each other in an extending direction. The optical waveguides 2A and 3A may have the same optical length. However, the optical waveguides 2A and 3A may have different optical lengths. The optical waveguides 2B and 3B may have the same optical length. However, the optical waveguides 2B and 3B may have different optical lengths.

The first end facet 1a and the second end facet 1b each extend in a direction intersecting the waveguiding direction of the optical waveguides 2A, 2B, 3A, and 3B, and are arranged to oppose each other. A first upper electrode 11a and a second upper electrode 11b are respectively disposed on the optical waveguides 2B and 3B in the phase shifting section 10.

Incoming light from outside is entered into one of the optical waveguides 2A and 3A. In the example shown in FIG. 1, the optical waveguide 2A is optically coupled to an external light source S and incoming light L1 from outside is input to the optical waveguide 2A. The light source S may be a distributed-feedback (DFB) laser.

The optical coupler 30 couples or branches the guided light. The optical coupler 30 branches the light, which has been input to the Mach-Zehnder interferometer type optical modulator 1A from outside through one of the optical waveguides 2A and 3A, to the optical waveguides 2B and 3B. The optical coupler 30 may be configured as a multimode interference (MMI) optical coupler having two input ports and two output ports.

The optical coupler 30 has a first port P1 and a fourth port P4 that function as input ports. The optical coupler 30 also has a second port P2 and a third port P3 that function as output ports. The second port P2 functions as a through port for the first port P1. The third port P3 functions as a cross port for the first port P1. The second port P2 functions as a cross port for the fourth port P4. The third port P3 functions as a through port for the fourth port P4.

One end of the optical waveguide 2A is connected to the first end facet 1a of the Mach-Zehnder interferometer type optical modulator 1A and the other end thereof is connected to the first port P1 of the optical coupler 30. One end of the optical waveguide 3A is connected to the first end facet 1a of the Mach-Zehnder interferometer type optical modulator 1A and the other end thereof is connected to the fourth port P4 of the optical coupler 30. One end of the optical waveguide 2B is connected to the second port P2 of the optical coupler 30 and the other end thereof is connected to the second end facet 1b of the Mach-Zehnder interferometer type optical modulator 1A. One end of the optical waveguide 3B is connected to the third port P3 of the optical coupler 30 and the other end thereof is connected to the second end facet 1b of the Mach-Zehnder interferometer type optical modulator 1A.

In the direction from the first end facet 1a to the second end facet 1b (the Y direction in the drawing), the optical coupler 30 branches the light input from one of the optical waveguides 2A and 3A to the optical waveguides 2B and 3B. In the direction from the second end facet 1b to the first end facet 1a, the optical coupler 30 couples light guided through the optical waveguide 2B and light guided through the optical waveguide 3B and branches the coupled light to the optical waveguides 2A and 3A.

In the phase control section 10, the refractive indices of the optical waveguides 2B and 3B are changed so that the phase of light is controlled.

FIG. 2A is a cross-sectional view of the Mach-Zehnder interferometer type optical modulator 1A shown in FIG. 1 taken along line IIA-IIA. Referring to FIG. 2A, the phase shifting section 10 constitutes part of the optical waveguides 2B and 3B. The phase shifting section 10 includes a lower cladding layer 13 and two mesa structures 19a and 19b in addition to a lower electrode 18 and the first and second upper electrodes 11a and 11b described above. The lower cladding layer 13 covers the entirety of a main surface 4a of the semiconductor substrate 4.

The mesa structure 19a is formed on the section corresponding to the optical waveguide 2B on the lower cladding layer 13. The mesa structure 19b is formed on the section corresponding to the optical waveguide 3B on the lower cladding layer 13.

The mesa structure 19a constitutes an optical waveguide structure (first optical waveguide structure) of this embodiment. The mesa structure 19a includes part of the lower cladding layer 13, a first core layer 14a, a first upper cladding layer 15a, and a first contact layer 16a. The lower cladding layer 13 constitutes a first lower cladding layer of this embodiment. The mesa structure 19b constitutes an optical waveguide structure (second optical waveguide structure) of this embodiment. The mesa structure 19b includes part of the lower cladding layer 13, a second core layer 14b, a second upper cladding layer 15b, and a second contact layer 16b. The lower cladding layer 13 also constitutes a second lower cladding layer of this embodiment.

The lower cladding layer 13 is formed on the semiconductor substrate 4. The first core layer 14a is formed on the lower cladding layer 13. The first upper cladding layer 15a is formed on the first core layer 14a. The refractive index of the first core layer 14a is larger than those of the lower cladding layer 13 and the first upper cladding layer 15a. The first core layer 14a may be composed of an undoped semiconductor. These layers of the mesa structure 19a constitute part of the optical waveguide 2B with the first core layer 14a at the center. The lower cladding layer 13 may be composed of, for example, an n-type semiconductor. The first upper cladding layer 15a may be composed of, for example, a p-type semiconductor.

The second core layer 14b is formed on the lower cladding layer 13. The second upper cladding layer 15b is formed on the second core layer 14b. The refractive index of the second core layer 14b is larger than those of the lower cladding layer 13 and the second upper cladding layer 15b. The second core layer 14b may be composed of an undoped semiconductor. These layers of the mesa structure 19b constitute part of the optical waveguide 3B with the second core layer 14b at the center. The second upper cladding layer 15b may be composed of, for example, a p-type semiconductor.

The first and second core layers 14a, 14b may be composed of a semiconductor such as GaInAsP, AlGaInAs, AlInAs, and GaInAs. These semiconductor materials can be lattice-matched to InP. Accordingly, the first and second core layers 14a, 14b having good crystal quality can be formed on the InP substrate. These semiconductor materials also have a band gap energy corresponding to the wavelength band used in optical fiber communication, i.e., 1.3 µm to 1.55 µm. Accordingly, when the first and second core layers 14a, 14b are composed of such a semiconductor material, an optical modulator suitable for optical communication usage can be obtained. The first and second core layers 14a, 14b may be a single layer (bulk layer) or may have a quantum well structure constituted by alternately stacked well layers and barrier layers.

The lower cladding layer 13 and the first and second upper cladding layers 15a, 15b are preferably composed of a semiconductor material having a refractive index smaller than that of the first core layer 14a or the second core layer 14b. For example, the lower cladding layer 13 and the first and second upper cladding layers 15a, 15b may be composed of a semiconductor material selected from InP, GaInAsP, AlGaInAs, and AlInAs. In the structure having a lower cladding layer 13 composed of InP and first and second upper cladding layers 15a, 15b composed of InP, carriers and light guiding in the optical waveguide can be well confined in the first and second core layers 14a, 14b.

The first contact layer 16a is disposed on the first upper cladding layer 15a. The second contact layer 16b is disposed on the second upper cladding layer 15b. The contact layers 16a and 16b may be composed of, GaInAs or GaInAsP, for example.

The first upper electrode 11a is formed on the first contact layer 16a. The second upper electrode 11b is formed on the second contact layer 16b. The lower electrode 18 is formed on a back surface 4b of the semiconductor substrate 4.

Both side surfaces of the mesa structures 19a and 19b are buried by a resin layer 17 composed of a benzocyclobutene (BCB) resin or a polyimide resin.

FIG. 2B is a cross-sectional view of the Mach-Zehnder interferometer type optical modulator 1A shown in FIG. 1 taken along line IIB-IIB. Referring to FIG. 2B, the waveguiding sections 20A and 20B have a lower cladding layer 23 and a mesa structure 29. The mesa structure 29 is an optical waveguide structure of this embodiment. The mesa structure 29 includes part of the lower cladding layer 23, a core layer 24, and an upper cladding layer 25. The mesa structure 29 is formed on the sections of the lower cladding layer 23 respectively corresponding to the optical waveguides 2A and 2B. The optical waveguide 2A and 2B include the lower cladding layer 23, the core layer 24, and the upper cladding layer 25.

The cladding layer 23 may be integrally formed with the lower cladding layer 13 of the phase shifting section 10. The core layer 24 may be integrally formed with the first core layer 14a of the phase shifting section 10. The upper cladding layer 25 may be integrally formed with the first upper cladding layer 15a of the phase shifting section 10.

Both side surfaces of the mesa structure 29 is buried by a resin layer 17 as with the mesa structures 19a and 19b of the phase shifting section 10.

The core layers 24 is formed on the lower cladding layer 23. The upper cladding layers 25 is formed on the core layers 24. The refractive index of the core layer 24 is larger than the refractive index of the lower cladding layer 23 and the upper cladding layer 25. These layers of the mesa structures 29 constitute part of the optical waveguides 2A and 2B with the core layer 24 at the center. The semiconductor material constituting the core layer 24 and the internal structure of the core layer 24 are the same as those of the core layers 14a and 14b described above. The semiconductor material constituting the lower cladding layer 23 and the upper cladding layer 25 is the same as those of the lower cladding layer 13 and the upper cladding layers 15a and 15b described above.

FIG. 3 is a cross-sectional view of the Mach-Zehnder interferometer type optical modulator 1A shown in FIG. 1 taken along line III-III. Referring to FIG. 3, the optical coupler 30 includes a lower cladding layer 33 and a mesa structure 39. The lower cladding layer 33 may be integrally formed with the lower cladding layer 13 and the lower cladding layer 23. The mesa structure 39 constitutes an optical waveguide structure of this embodiment. The mesa structure 39 is formed on the lower cladding layer 33. The mesa structure 39 includes part of the lower cladding layer 33, a core layer 34, and an upper cladding layer 35. Both side surfaces of the mesa structure 39 are buried by the resin layer 17 as with the mesa structures 19a, 19b, and 29.

The core layer 34 is formed on the lower cladding layer 33. The upper cladding layer 35 is formed on the core layer 34. The refractive index of the core layer 34 is larger than the refractive index of the lower cladding layer 33 and the upper cladding layer 35. The core layer 34 of the optical coupler 30 is optically connected to the core layer 24 described above. The semiconductor material constituting the core layer 34 and the internal structure of the core layer 34 are the same as those of the core layers 14a, 14b, and 24 described above. The semiconductor material constituting the lower cladding layer 33 and the upper cladding layer 35 is the same as those of the lower cladding layer 13 and the upper cladding layers 15a and 15b described above.

Next, operation of the Mach-Zehnder interferometer type optical modulator 1A is described. For the purposes of description, it is assumed that the electrical signal voltage V for modulation is applied only to the first upper electrode 11a of the phase shifting section 10 of the optical waveguide 2B. Continuous wave (CW) light having single wavelength is input from the light source S to one of the optical waveguides 2A and 3A of the Mach-Zehnder interferometer type optical modulator 1A. Alternatively, the light may be input to the Mach-Zehnder interferometer type optical modulator 1A from the light source S via an optical isolator H. In the example shown in FIG. 1, incoming light L1 is input to the optical waveguide 2A from the light source S via the optical isolator H. The guided light that has propagated in the optical waveguide 2A is input to the first port P1 of the optical coupler 30. The guided light input to the first port P1 propagates in the optical coupler 30 and is branched to the second port P2 and the third port P3. During this process, the second port P2 functions as a through port and the third port P3 functions as a cross port.

The optical coupler 30 is configured such that the guided light input to the optical coupler 30 through the first port P1 is branched at a 1:1 power ratio and that the phase of the guided light output to the third port P3 functioning as a cross port is delayed by $\pi/2$ with respect to the second port P2 functioning as a through port. For example, when a MMI coupler is used, the lengths of the MMI optical coupler in the X and Y directions, the distance between the first port P1 and the fourth port P4, and the distance between the second port P2 and the third port P3 may be adequately adjusted to change the optical path length between the input port and the through port and the optical path length between the input port and the cross port. In addition, the branching ratio of light output to the through port and the cross port from the input port can be adjusted. Accordingly, when a MMI optical coupler is used as the optical coupler 30, an optical coupler 30 that satisfies the above-described conditions can be prepared.

The guided light branched to the second port P2 and the third port P3 is guided to the second end facet 1b-side through the waveguiding section 20B of the optical waveguides 2B and 3B and the phase shifting section 10, and is reflected by the second end facet 1b. The reflected light travels in the opposite direction, i.e., toward the first end facet 1a, through the optical waveguides 2B and 3B and returns to the second port P2 and the third port P3.

An electrical signal voltage modulated with a 0-level and 1-level is applied to the first upper electrode 11a of the phase shifting section 10 of the optical waveguide 2B. When a 0-level electrical signal voltage is applied to the upper electrode 11a of the phase shifting section 10, the 0-level electrical signal voltage is adjusted so that the phase of light guided in the optical waveguide 3B is ahead of the phase of light guided in the optical waveguide 2B by $\pi$. When a 1-level electrical signal voltage is applied to the phase shifting section 10 of the optical waveguide 2B, the 1-level electrical signal voltage is adjusted to eliminate the difference between the phase of the guided light in the optical guide 3B and the phase of the guided light in the optical guide 2B.

First, the case in which a 1-level electrical signal voltage is applied to the first upper electrode 11a of the phase shifting section 10 of the optical waveguide 2B is discussed. A phase difference does not occur between the light guided in the optical waveguide 2B and the light guided in the optical waveguide 3B while two guided light beams are guided through the optical waveguides 2B and 3B and reflected back at the second end facet 1b. Accordingly, when two guided light beams reach the second port P2 and the third port P3 after reflecting at the second end facet 1b, the phase relationship between the guided light at the third port P3 and the guided light at the second port P2 is maintained. That is, the phase of the guided light returning to the third port P3 is delayed by $\pi/2$ with respect to the phase of the guided light returning to the second port P2.

The two guided light reflected by the second end facet 1b and reaching the second port P2 and the third port P3 are optically coupled by the optical coupler 30, and are output to the first port P1 or the fourth port P4. In the optical coupler 30, the branching ratio and the phase relationship between the through port and the cross port do not change at the time for branching or coupling the guided lights. In this embodiment, the phase of light output from the cross port of the MMI optical coupler is delayed by $\pi/2$ from the phase of light output from the through port. Accordingly, at the first port P1, the phase of light from the third port P3 is delayed by $\pi/2$ with respect to the light from the second port P2 through the optical coupler 30. Similarly, at the fourth port P4, the phase of light from the second port P2 is delayed by $\pi/2$ from the light from the third port P3 through the optical coupler 30.

The optical output from the fourth port P4 will now be described. When the guided lights reach the second port 2 and the third port 3 of the optical coupler 30 after reflecting at the second end facet 1b, the phase of the guided light at the third port P3 is delayed by $\pi/2$ with respect to the guided light at the second port P2. Subsequently, as the guided light travel through the optical coupler 30, the phase of light from the second port P2 is delayed by $\pi/2$ with respect to the light from the third port P3. As a result, the phase difference between the guided light from the second port P2 and the guided light from the third port P3 is canceled. Accordingly, the two guided light beams are optically coupled in the fourth port P4 while intensifying each other. Therefore, a 1-level optical signal is output to the fourth port P4.

The optical output from the first port P1 will now be described. When the guided lights reach the second port 2 and the third port 3 of the optical coupler 30 after reflecting at the second end facet 1b, the phase of the guided light at the third port P3 is delayed by $\pi/2$ with respect to the phase of the guided light at the second port P2. Subsequently, as the guided light travels through the optical coupler 30, the phase of light from the third port P3 to the first port P1 is further delayed by $\pi/2$ with respect to the phase of the light from the second port P2 to the first port P1. This means that the phase of light from the third port P3 to the first port P1 is delayed by $\pi$ with respect to the phase of the light from the second port P2 to the first port P1. Accordingly, the two guided light beams are coupled with each other while canceling each other. Therefore, a 0-level optical signal is output to the first port P1.

The case in which a 0-level electrical signal voltage is applied to the first upper electrode 1a of the phase shifting section 10 of the optical waveguide 2B is discussed next. As described above, while two guided light beams respectively branched to the second port P2 and the third port P3 are guided through the optical waveguides 2B and 3B and reflected back at the second end facet 1b, the phase of the light guided in the optical waveguide 3B is advanced by $\pi$ with respect to the phase of the light guided in the optical waveguide 2B. The phase of the guided light at the third port P3 is delayed by $\pi/2$ with respect to the phase of the guided light at the second port P2 after branching the incoming light through the optical coupler 30. Subsequently, the guided light propagates in the optical waveguides 2B and 3B, is reflected by the second end facet 1b and returns to the second port P2 or the third port P3. At this time, the amount of change ($\pi$) in the phase of the light guided in the optical waveguide 3B relative to the phase of the light guided in the optical waveguide 2B is added. As a result, the phase of the guided light from the third port P3 is advanced by $\pi/2$ with respect to the phase of the guided light from the second port P2.

The two guided light beams reaching the second port P2 and the third port P3 are re-coupled by the optical coupler 30 and light is output from the first port P1 or the fourth port P4. At this time, at the first port P1, the phase of light from the third port P3 is delayed by π/2 with respect to the phase of the light from the second port P2 through the optical coupler 30. Meanwhile, at the fourth port P4, the phase of light from the second port P2 is delayed by π/2 with respect to the phase of the light from the third port P3 through the optical coupler 30.

The optical output from the fourth port P4 will now be described. When the guided lights reach the second port P2 and the third port P3 of the optical coupler 30 after reflecting at the second facet 1b, the phase of the guided light at the third port P3 is advanced by π/2 with respect to the phase of the guided light at the second port P2. Subsequently, as the guided light travels through the optical coupler 30, the phase of light from the second port P2 to the fourth port P4 is delayed by π/2 with respect to the phase of the light from the third port P3 to the fourth port P4. As a result, the phase difference between the guided light from the second port P2 to the fourth port P4 and the guided light from the third port P3 to the fourth port P4 is π. Accordingly, the two guided light beams are coupled with each other while canceling each other at the fourth port P4. Therefore, a 0-level optical signal is output to the fourth port P4.

The optical output from the first port P1 will now be described. When the guided lights reach the second port P2 and the third port P3 of the optical coupler 30 after reflecting at the second facet 1b, the phase of the guided light at the third port P3 is advanced by π/2 with respect to the phase of the guided light at the second port P2. Subsequently, as the guided light travels through the optical coupler 30, the phase of light from the third port P3 to the first port P1 is delayed by π/2 with respect to the phase of the light from the second port P2 to the first port P1. As a result, the phase difference between the guided light from the second port P2 to the first port P1 and the guided light from the third port P3 to the first port P1 is canceled. Accordingly, the two guided light beams are optically coupled in the first port P1 while intensifying each other. Therefore, a 1-level optical signal is output to the first port P1.

In summary, when a 0-level electrical signal voltage is applied to the first upper electrode 11a of the phase shifting section 10 of the optical waveguide 2B, a 1-level optical signal is output from the first port P1 and a 0-level optical signal is output from the fourth port P4. Conversely, when a 1-level electrical signal voltage is applied to the first upper electrode 11a of the phase shifting section 10 of the optical waveguide 2B, a 0-level optical signal is output from the first port P1 and a 1-level optical signal is output from the fourth port P4. In other words, a modulated signal light having a pattern reverse of the electrical signal voltage (that is, reverse phase pattern) is output from the first port P1. Meanwhile, a modulated signal light having the same pattern as the electrical signal voltage (that is, in-phase pattern) is output from the fourth port P4. For example, optical communication can be performed by using the modulated signal light from the fourth port P4 as the outgoing light L3.

The Mach-Zehnder interferometer type optical modulator 1a of this embodiment is a reflective-type device in which guided light is branched or coupled by the single optical coupler 30 and is reflected by the second end facet 1b functioning as a reflecting portion. Accordingly, the device length in the waveguiding direction can be shortened. Thus, the Mach-Zehnder interferometer type optical modulator can be easily installed in a small-size optical module. Since the device size is reduced, the device capacitance can be decreased. As a result, high speed operation exceeding, for example, 10 Gbps can be achieved.

In the embodiment above, only the case in which an electrical signal voltage V is applied only to the first upper electrode 11a of the phase shifting section 10 of the optical waveguide 2B is described as an example. However, the voltage application is not limited to this. An electrical signal voltage may be applied only to the second upper electrode 11b of the phase shifting section 10 of the optical waveguide 3B. Electrical signal voltages can be simultaneously applied to the optical waveguides 2B and 3B so that modulation can be achieved by a push-pull operation. In this embodiment, to change the refractive index of the optical waveguide 2B or 3B in the phase shifting section 10, electrical signal voltage is applied to the first upper electrode 1a or the second upper electrode 11b. However, signal current may be also injected into the optical waveguides 2B and 3B through the first upper electrode 11a or the second upper electrode 11b to change the refractive index of the optical waveguide 2B or 3B in the phase shifting section 10.

The operation of the light source S may become unstable if the optical signal (outgoing light L2 in FIG. 1) output from the first port P1 returns to the light source S via the optical fiber F1. In order to prevent outgoing light L2 from returning to the light source S, as shown in FIG. 1, an optical isolator H is preferably optically connected between the light source S and the optical waveguide 2A.

As described above, a high-reflection film HR may be formed in the second end facet 1b of the Mach-Zehnder interferometer type optical modulator 1A of this embodiment. The high-reflection film HR may be, for example, a multilayer film including many dielectric films having a high refractive index and a low refractive index alternately stacked. Specific examples of the high-reflection film HR include multilayer films including low-refractive-index dielectric films composed of silicon oxide, silicon nitride, or aluminum oxide and high-refractive-index dielectric films composed of titanium oxide, tantalum oxide, or zirconium oxide that are alternately stacked. Alternatively, a multilayer film including low-refractive-index dielectric films composed of silicon oxide, silicon nitride, or aluminum oxide and amorphous Si films which are high-refractive index-semiconductor films that are alternately stacked may be used as the high-reflection film HR. A metal film, such a gold film, having a high reflectance may be used as the high-reflection film HR. These high-reflection films can be easily fabricated by using a vapor deposition machine, a sputtering machine, or a chemical vapor deposition (CVD) machine. The high-reflection film HR preferably has a reflectivity of 70% or higher. And more preferably, the high-reflection film HR has a reflectivity of 99% or higher.

As shown in FIG. 1, an anti-reflection film LR that prevents reflection of the guided light may be provided in the first end facet 1a of the Mach-Zehnder interferometer type optical modulator 1A. When the anti-reflection film LR is provided, the incoming light L1 and the outgoing light L2 are prevented from being reflected by the first end facet 1a. As a result, the optical coupling efficiency between the optical fiber F1 and the Mach-Zehnder interferometer type optical modulator 1A can be improved. Moreover, the outgoing light L2 and L3 are prevented from being reflected by the first end facet 1a and the adverse effects on the modulation operation of the Mach-Zehnder interferometer type optical modulator 1A can be diminished. A low-refractive-index film such as a film composed of silicon oxide, silicon nitride, or aluminum oxide can be used as the anti-reflection film LR. The reflectivity of the anti-reflection film LR is preferably 1% or less and more preferably less than 0.1%.

MODIFICATION EXAMPLE 1

Figure 4:
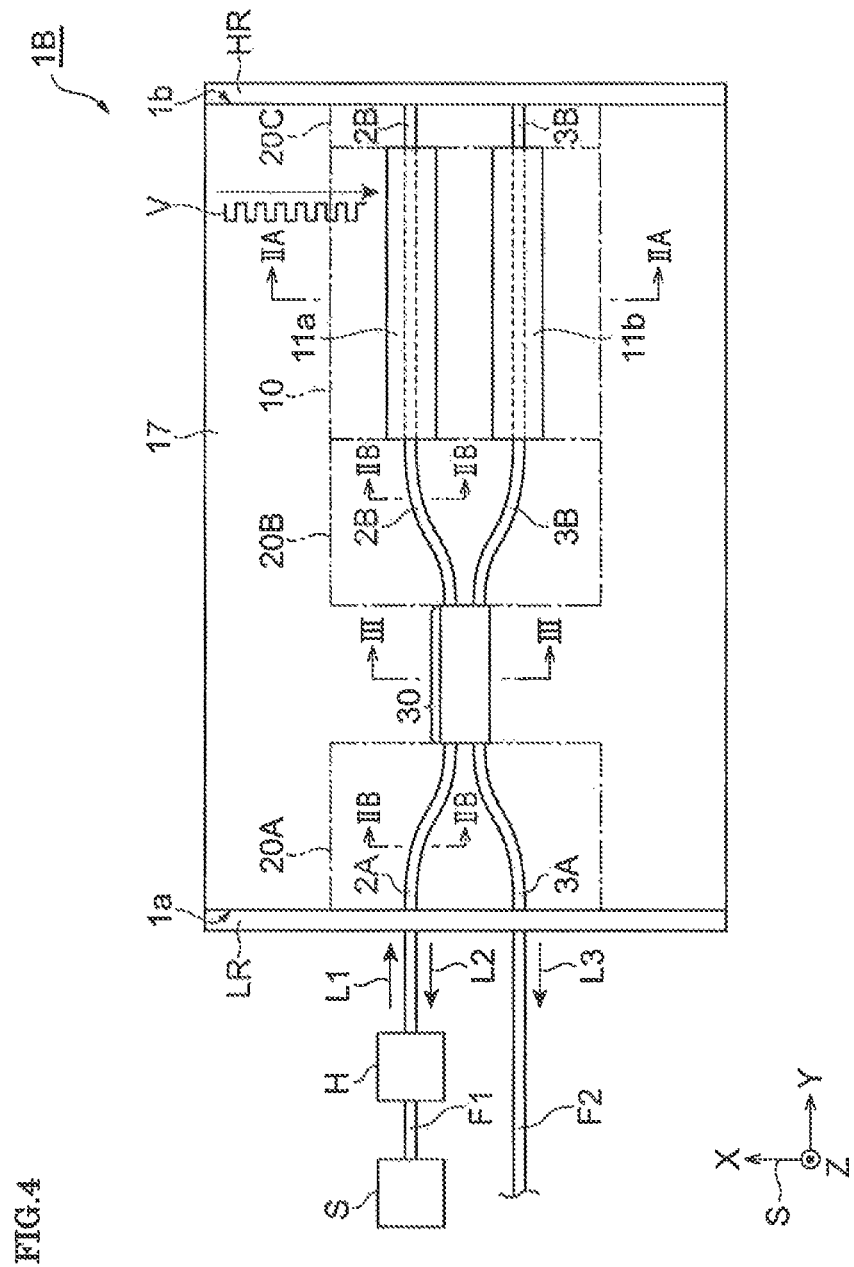
FIG. 4 is a plan view showing Modification Example 1 of the Mach-Zehnder interferometer type optical modulator.

Modification Example 1 of the Mach-Zehnder interferometer type optical modulator 1A described above will now be described. FIG. 4 is a plan view showing Modification Example 1 of a Mach-Zehnder interferometer type optical modulator.

A Mach-Zehnder interferometer type optical modulator 1B shown in FIG. 4 differs from the Mach-Zehnder interferometer type optical modulator 1A shown in FIG. 1 in that the Mach-Zehnder interferometer type optical modulator 1B has a predetermined gap between the phase shifting section 10 and the second end facet 1b. The phase shifting section 10 is disposed apart from the second end facet 1b by the predetermined gap. In other words, the Mach-Zehnder interferometer type optical modulator 1B includes a waveguiding section 20C between the phase shifting section 10 and the second end facet 1b. The waveguiding section 20C extends from the phase shifting section 10 to the second end facet 1b. The waveguiding section 20C includes two optical waveguide structures constituting part of the optical waveguides 2B and 3B, the optical waveguide structures each including a lower cladding layer on the semiconductor substrate 4, a core layer on the lower cladding layer, and an upper cladding layer on the core layer. The optical waveguide structures may be the same as one shown in FIG. 2B.

The second and facet 1b is formed by, for example, cleaving. When the second end facet 1b is terminated with the phase shifting section 10 having first and second upper electrodes 11a and 11b as with the Mach-Zehnder interferometer type optical modulator 1A shown in FIG. 1, the electrode material on the device surface may adhere on the second end facet 1b during cleavage. When the electrode material contacts the second end facet 1b, the leakage current may increase at the end facet and crystal deterioration may occur at the end facet in the phase shifting section 10.

In contrast, when the second end facet 1b is terminated with the waveguiding section 20C not having electrodes shown in FIG. 4, no electrode material is present near the second end facet 1b. Thus, adhesion of the electrode onto the end facet mentioned above does not occur. Thus, the increase in leakage current and crystal deterioration at the end facet can be suppressed.

MODIFICATION EXAMPLE 2

Figure 5:
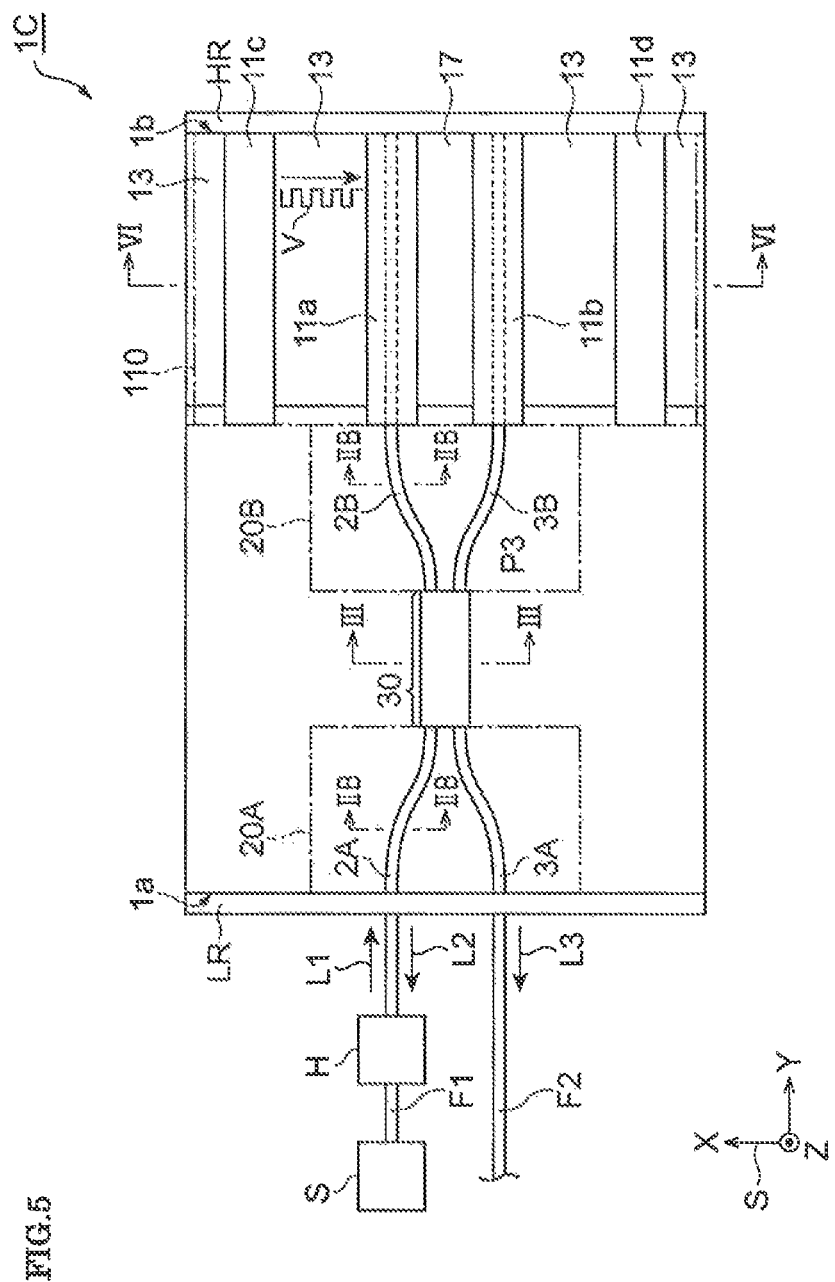
FIG. 5 is a plan view showing Modification Example 2 of the Mach-Zehnder interferometer type optical modulator.
Figure 6:
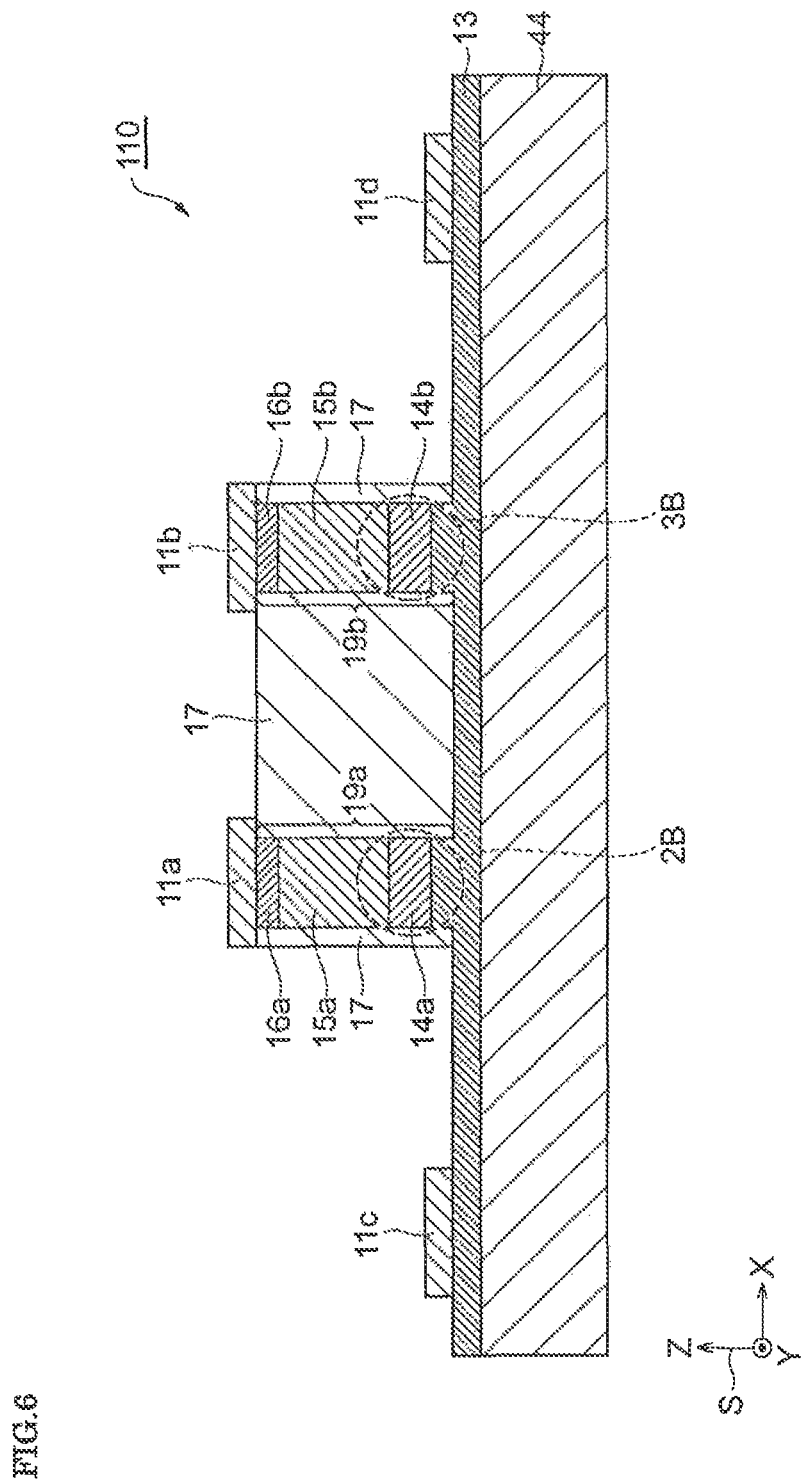
FIG. 6 is a cross-sectional view of the Mach-Zehnder interferometer type optical modulator shown in FIG. 5 taken along line VI-VI.

Modification Example 2 of the Mach-Zehnder interferometer type optical modulator 1A described above will now be described. FIG. 5 is a plan view showing Modification Example 2 of a Mach-Zehnder interferometer type optical modulator. FIG. 6 is a cross-sectional view of the Mach-Zehnder interferometer type optical modulator shown in FIG. 5 taken along line VI-VI.

A Mach-Zehnder interferometer type optical modulator 1C shown in FIGS. 5 and 6 differs from the Mach-Zehnder interferometer type optical modulator 1A shown in FIG. 1 in that a semi-insulating substrate is used as the semiconductor substrate. Accordingly, the structure of a phase shifting section 110 of the Mach-Zehnder interferometer type optical modulator 1C differs from the structure of the phase shifting section 10 of the Mach-Zehnder interferometer type optical modulator 1A.

According to Modification Example 2, an Fe-doped InP substrate may be used as a semi-insulating semiconductor substrate 44. In this case, the lower electrodes 11c and 11d are formed on the conductive lower cladding layer 13 on the semiconductor substrate 44 in the phase shifting section 110. The lower cladding layer 13 is composed of, for example, n-type InP.

According to the Mach-Zehnder interferometer type optical modulator 1C of this modification example which uses an Fe-doped InP substrate as the semiconductor substrate, the device capacitance can be decreased compared to a device formed on an electrically conductive semiconductor substrate such as an n-type or a p-type InP substrate. Thus, high-speed modulation can be realized.

MODIFICATION EXAMPLE 3

Figure 7:
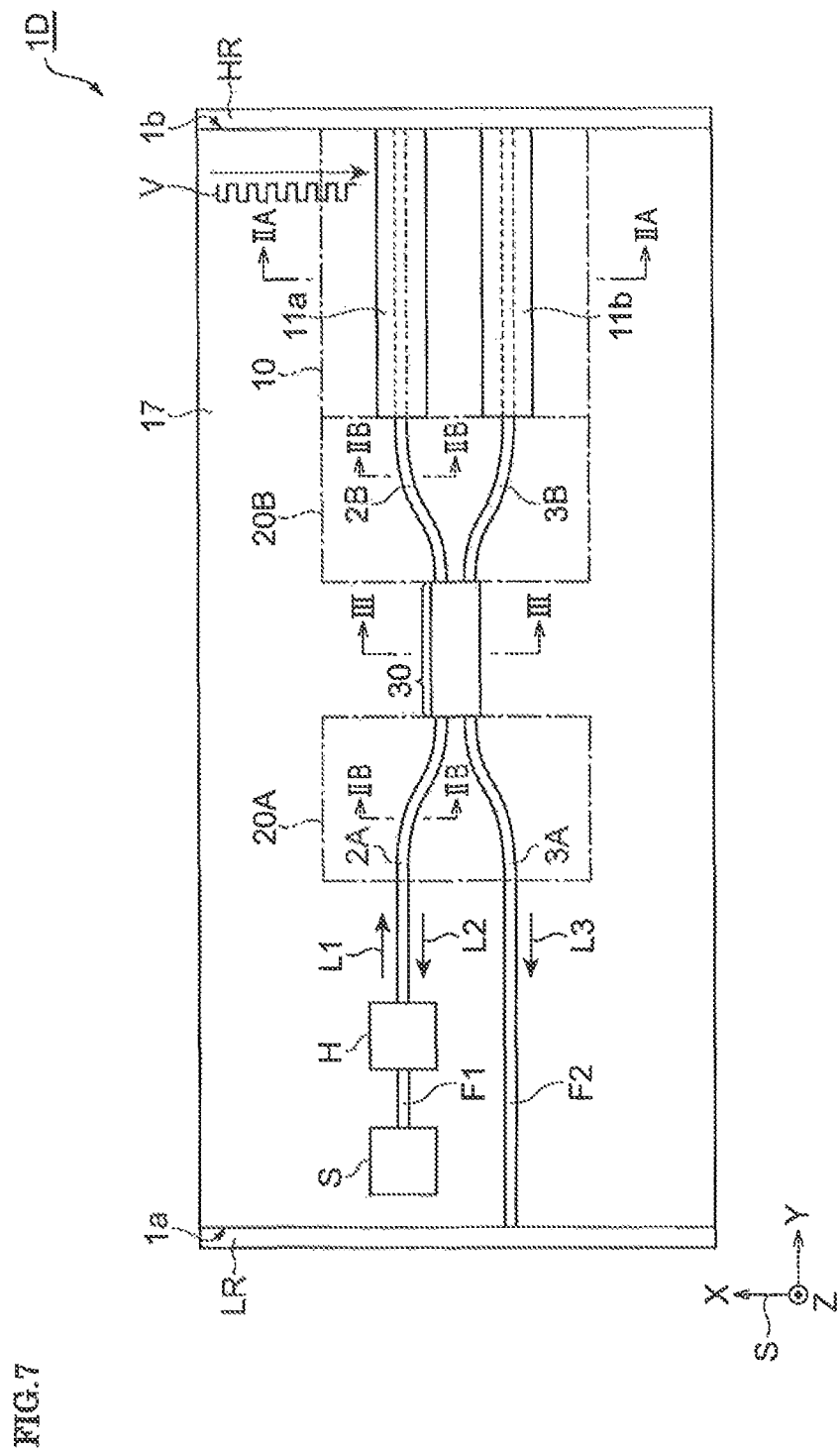
FIG. 7 is a plan view showing Modification Example 3 of the Mach-Zehnder interferometer type optical modulator.

Modification Example 3 of the Mach-Zehnder interferometer type optical modulator 1A described above will now be described. FIG. 7 is a plan view showing Modification Example 3 of a Mach-Zehnder interferometer type optical modulator.

A Mach-Zehnder interferometer type optical modulator 1D shown in FIG. 7 differs from the Mach-Zehnder interferometer type optical modulator 1A shown in FIG. 1 in that the light source S is integrally provided on the semiconductor substrate 4 which is part of the modulator 1D. The light source S provides input guided light to one of the optical waveguide 2A and the optical waveguide 3A. Since the light source S is disposed on the semiconductor substrate 4 which is part of the Mach-Zehnder interferometer type optical modulator 1D, the optical transmission system as a whole can achieve size reduction.

When an optical isolator H is used, the optical isolator H in addition to the light source S may be provided on the semiconductor substrate 4 which is part of the Mach-Zehnder interferometer type optical modulator 1D. The optical isolator H which can be integrated on the same substrate as the light source S may be an optical isolator in which a ferromagnetic metal composed of iron or cobalt and a semiconductor are combined, for example. In such a case, the optical transmission system as a whole including the light source S and the optical isolator H can achieve size reduction.

MODIFICATION EXAMPLE 4

Figure 8:
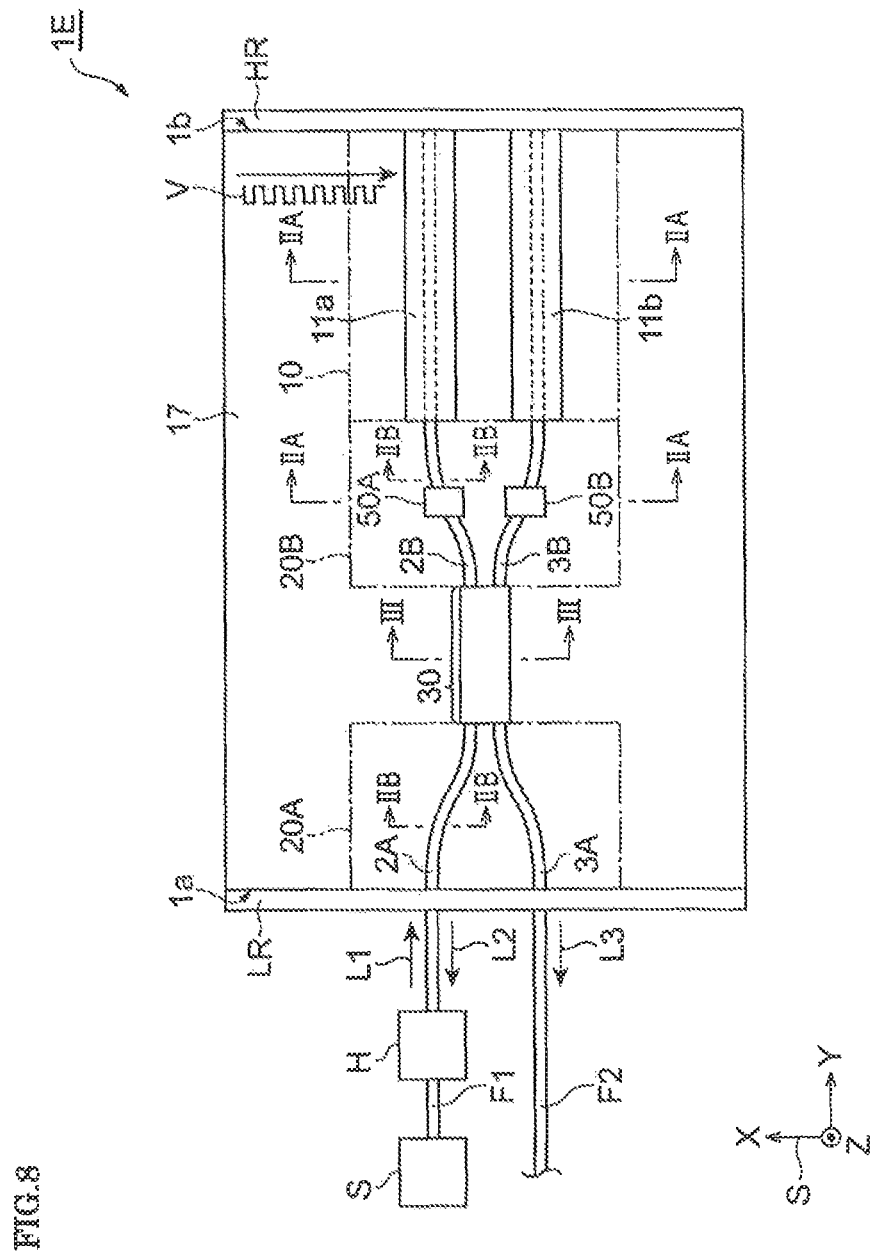
FIG. 8 is a plan view showing Modification Example 4 of the Mach-Zehnder interferometer type optical modulator.

Modification Example 4 of the Mach-Zehnder interferometer type optical modulator 1A described above will now be described. FIG. 8 is a plan view showing Modification Example 4 of a Mach-Zehnder interferometer type optical modulator.

A Mach-Zehnder interferometer type optical modulator 1B shown in FIG. 8 differs from the Mach-Zehnder interferometer type optical modulator 1A shown in FIG. 1 in that the modulator further includes phase adjusting sections 50A and 50B. The phase adjusting sections adjust the phase of the guided light independently from the phase shifting section 10 by changing the refractive index of at least one of the optical waveguide 2B and the optical waveguide 3B. The phase adjusting sections 50A and 50B are disposed between the phase shifting section 10 and the optical coupler 30. The phase adjusting sections 50A and 50B respectively constitute part of the optical waveguide 2B and the optical waveguide 3B.

The phase adjusting sections 50A and 50B respectively include optical waveguide structures (third and fourth optical waveguide structures) each including a lower cladding layer on the semiconductor substrate, a core layer on the lower cladding layer, and an upper cladding layer on the core layer. Third and fourth upper electrodes are disposed on the third and fourth optical waveguide structures, respectively. In other words, the cross-sectional structures of the phase adjusting sections 50A and 50B may be the same as that of the phase shifting section 10 shown in FIG. 2A, for example.

The guided light beams that have propagated through the optical waveguides 2B and 3B and have been reflected by the second end facet 1b will have different reflective characteristics due to the variations that occurs during production of the Mach-Zehnder interferometer type optical modulators. Because of the difference in reflective characteristic, a difference in phase shift amount is generated at the second end facet 1b. The difference in phase shift amount differs from one device to another. As a result, the optimum value of the voltage applied to the first upper electrode 11a or the second upper electrode 11b of the phase shifting section 10 differs among devices. Accordingly, the application voltage needs to be adjusted for every device. The Mach-Zehnder interferometer type optical modulator discussed here further includes, between the phase shifting section 10 and the optical coupler 30, phase adjusting sections configured to adjust the optical phase of guided light independently from the phase shifting section 10 by changing the refractive index of at least one of the optical waveguide 2B and the optical waveguide 3B. The refractive index of the phase adjusting sections can be changed by applying a voltage to at least one of the third and fourth upper electrodes on the third and fourth optical waveguide structures of the phase adjusting sections. Because of the change in refractive index, the difference in phase shift amount at the second end facet 1b between the optical waveguide 2B and the optical waveguide 3B can be compensated. Accordingly, the conditions for the operation voltage of the phase shifting section 10 can be maintained substantially constant.

MODIFICATION EXAMPLE 5

Figure 9:
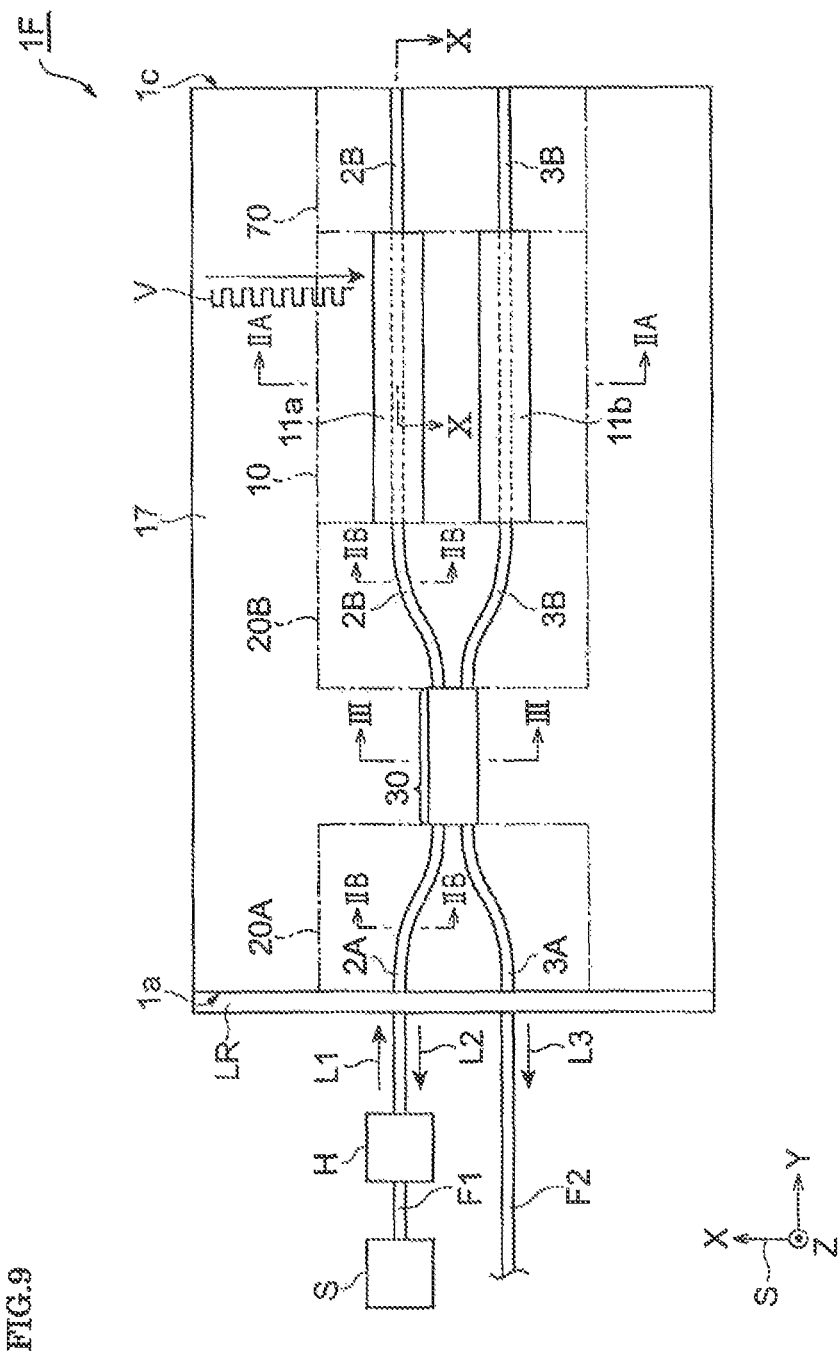
FIG. 9 is a plan view showing Modification Example 5 of the Mach-Zehnder interferometer type optical modulator.
Figure 10:
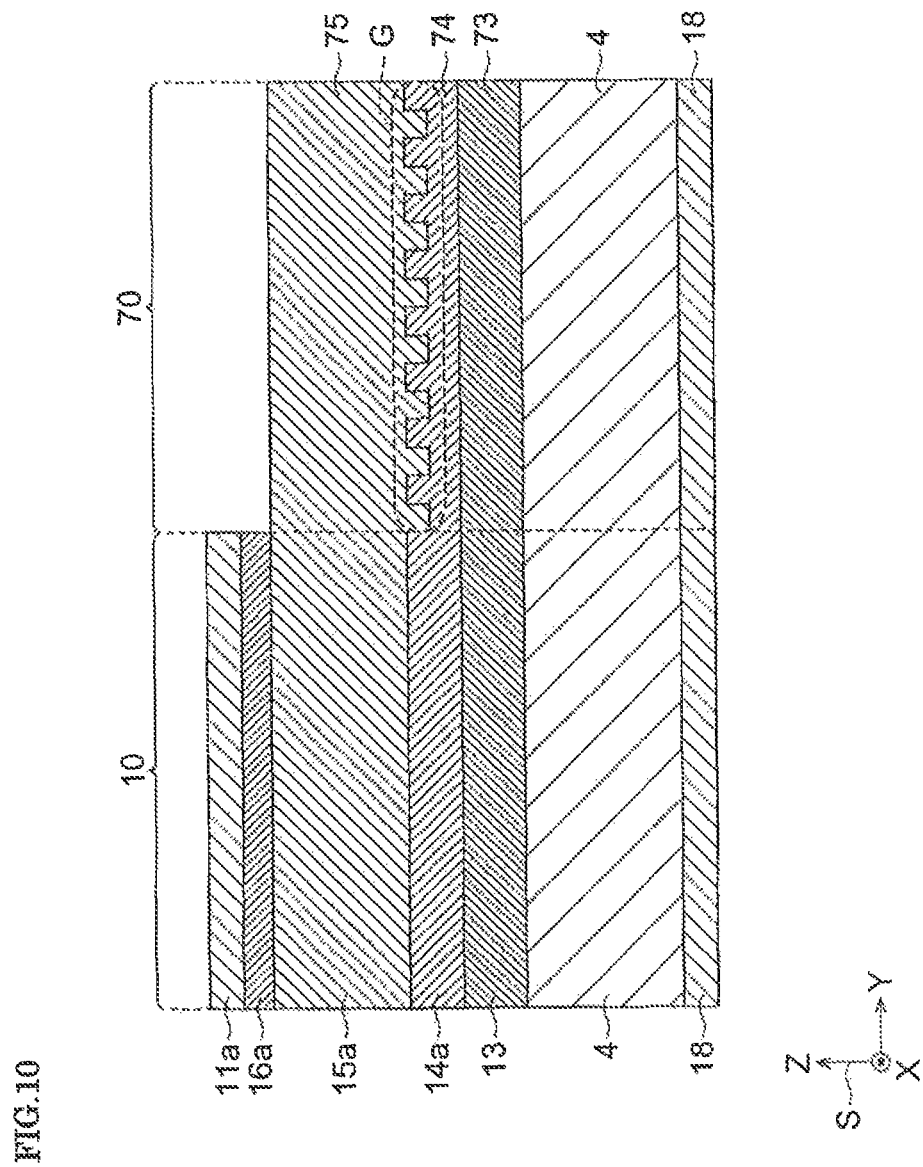
FIG. 10 is a cross-sectional view of the Mach-Zehnder interferometer type optical modulator shown in FIG. 9 taken along line X-X.

Modification Example 5 of the Mach-Zehnder interferometer type optical modulator 1A described above will now be described. FIG. 9 is a plan view showing Modification Example 5 of a Mach-Zehnder interferometer type optical modulator. FIG. 10 is a cross-sectional view of the Mach-Zehnder interferometer type optical modulator shown in FIG. 9 taken along line X-X.

A Mach-Zehnder interferometer type optical modulator 1F shown in FIG. 9 differs from the Mach-Zehnder interferometer type optical modulator 1A shown in FIG. 1 in that an and facet Ic and a distributed Bragg reflector (DBR) portion 70 are provided instead of the second end facet 1b and the high-reflection film HR, respectively. The DBR portion 70 is a reflecting portion according to this modification example and constitutes part of the optical waveguide 2B and part of the optical waveguide 3B. As shown in FIG. 10, the DBR portion 70 includes two optical waveguide structures (fifth and sixth optical waveguide structures) each including a lower cladding layer 73 on the semiconductor substrate 4, a core layer 74 on the lower cladding layer 73, and an upper cladding layer 75 on the core layer 74. The core layer 74 has a diffraction grating G formed therein.

The DBR portion 70 has a predetermined reflection band determined by the period of the diffraction grating. Accordingly, only a light having a predetermined wavelength can be reflected from among the light that has propagated through the optical waveguides 2B and 3B. In other words, the Mach-Zehnder interferometer type optical modulator 1F can selectively modulate a light with the predetermined wavelength. Thus, the noise of the modulated light can be reduced and the S/N ratio can be improved. The DBR portion 70 may be prepared by forming a diffraction grating G in the core layer. Thus, the DBR portion 70 can be formed within the semiconductor process of manufacturing a Mach-Zehnder interferometer type optical modulator.

MODIFICATION EXAMPLE 6

Figure 11:
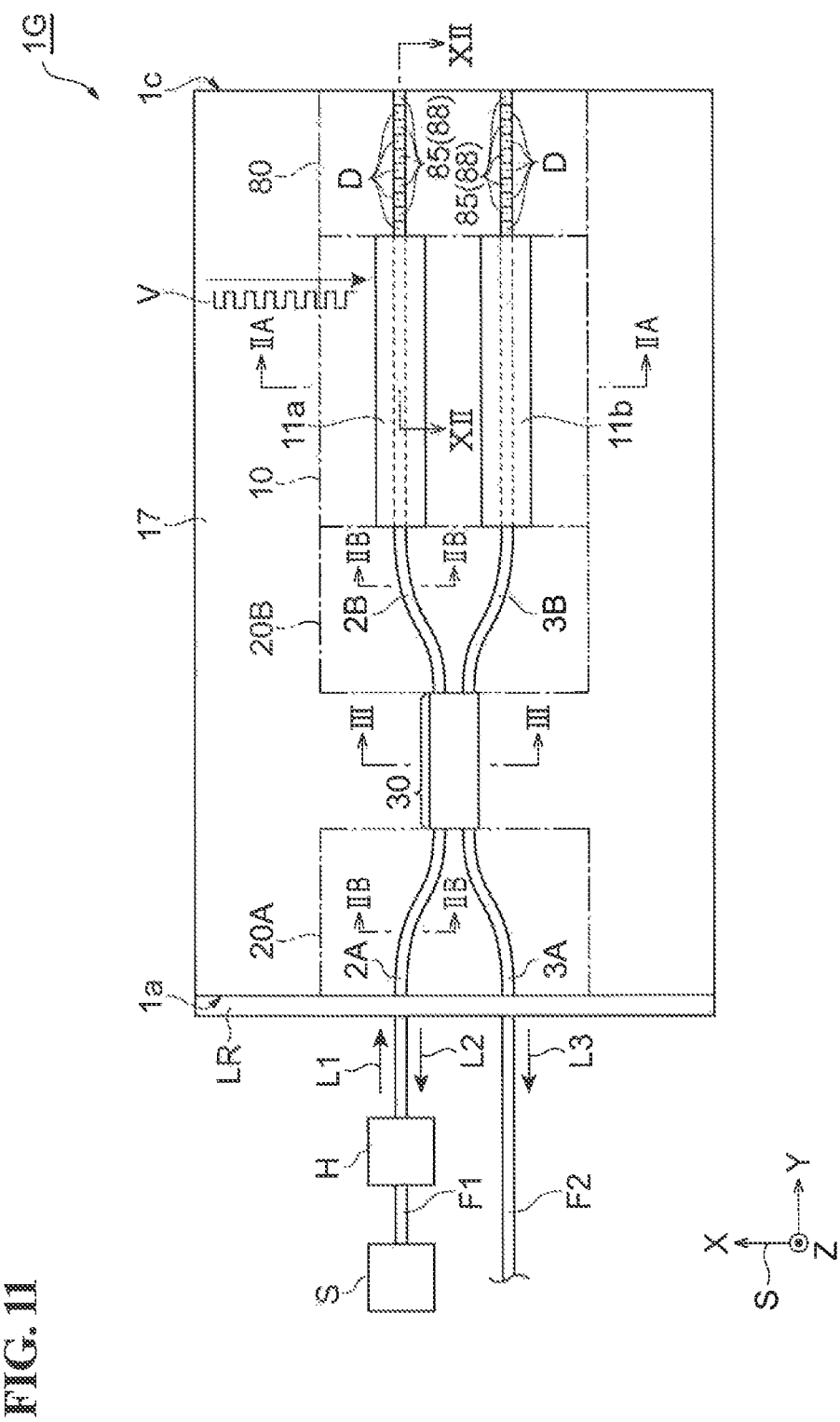
FIG. 11 is a plan view showing Modification Example 6 of the Mach-Zehnder interferometer type optical modulator.
Figure 12:
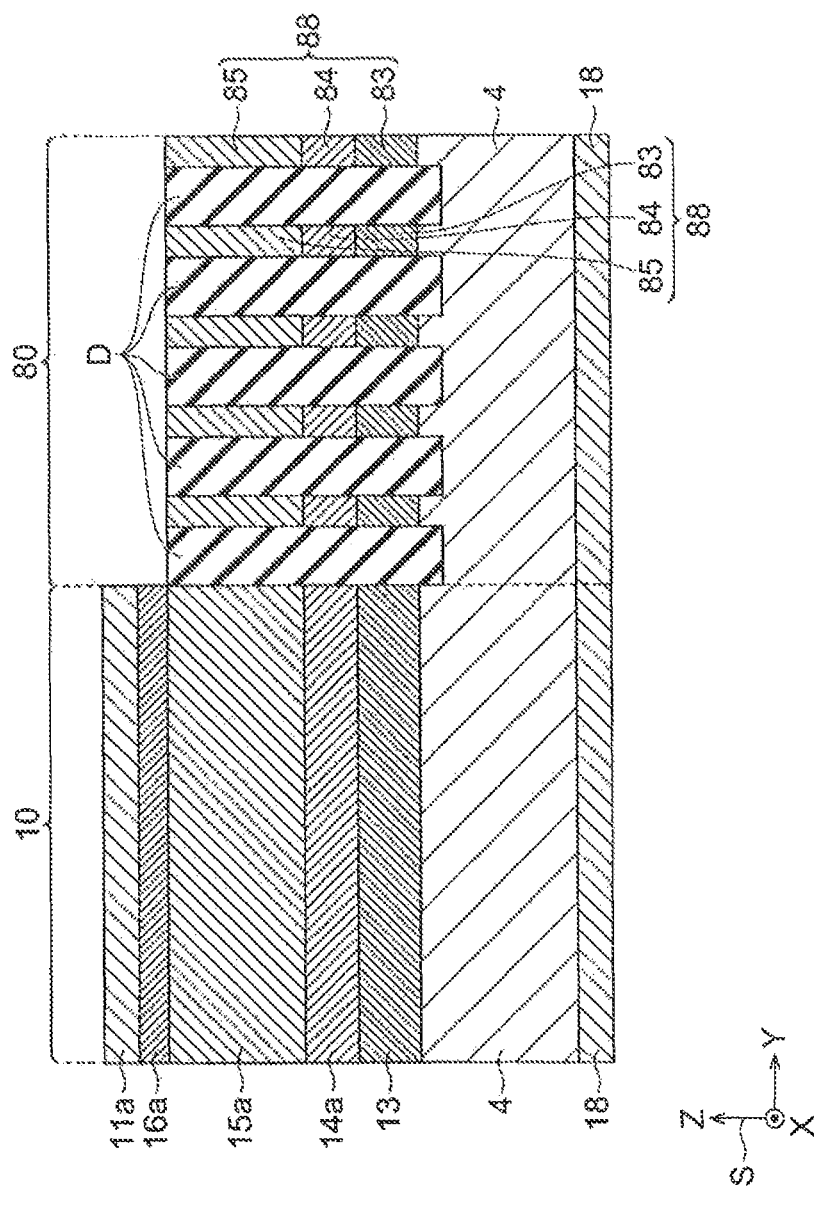
FIG. 12 is a cross-sectional view of the Mach-Zehnder interferometer type optical modulators shown in FIGS. 11 and 13 taken along line XII-XII.

Modification Example 6 of the Mach-Zehnder interferometer type optical modulator 1A described above will now be described. FIG. 11 is a plan view showing Modification Example 6 of a Mach-Zehnder interferometer type optical modulator. FIG. 12 is a cross-sectional view of the Mach-Zehnder interferometer type optical modulator shown in FIG. 11 taken along line XII-XII.

A Mach-Zehnder interferometer type optical modulator 1G shown in FIGS. 11 and 12 differs from the Mach-Zehnder interferometer type optical modulator 1A shown in FIG. 1 in that an end facet 1c and a DBR portion 80 are provided instead of the second end facet 1b and the high-reflection film HR. The DBR portion 80 is a reflecting portion in this modification example. The DBR portion 80 has a diffraction grating structure including semiconductor portions 88 and dielectric portions D alternately and periodically arranged in the waveguiding direction (Y direction in the example shown in FIGS. 11 and 12). The DBR portion 80 includes two optical waveguide structures (seventh and eight optical waveguide structures) each including dielectric portions D and semiconductor portions 88 including a lower cladding layer 83 on the semiconductor substrate 4, a core layer 84 on the lower cladding layer 83, and an upper cladding layer 85 on the core layer 84. The dielectric portions D are composed of a dielectric material.

The DBR portion 80 of the Mach-Zehnder interferometer type optical modulator 1G of Modification Example 6 has a predetermined reflection band determined by the period of the diffraction grating constituted by the semiconductor portions 88 and the dielectric portions D. Accordingly, only a light having a predetermined wavelength can be reflected among the light propagating through the optical waveguides 2B and 3B. Moreover, the difference in refractive index between the semiconductor portions and the dielectric portions of the diffraction grating can be increased. Thus, a high reflectivity of more than 90% can be easily achieved.

Examples of the dielectric material constituting the dielectric portions D include dielectric materials having a low refractive index such as benzocyclobutene resin (BCB), silicon oxide, silicon nitride, and polyimide resin. The dielectric portions D need not be filled with these dielectric materials and may be left empty. In other words, semiconductor portions 88 and air gaps between the semiconductor portions 88 may constitute the DBR portion 80.

MODIFICATION EXAMPLE 7

Figure 13:
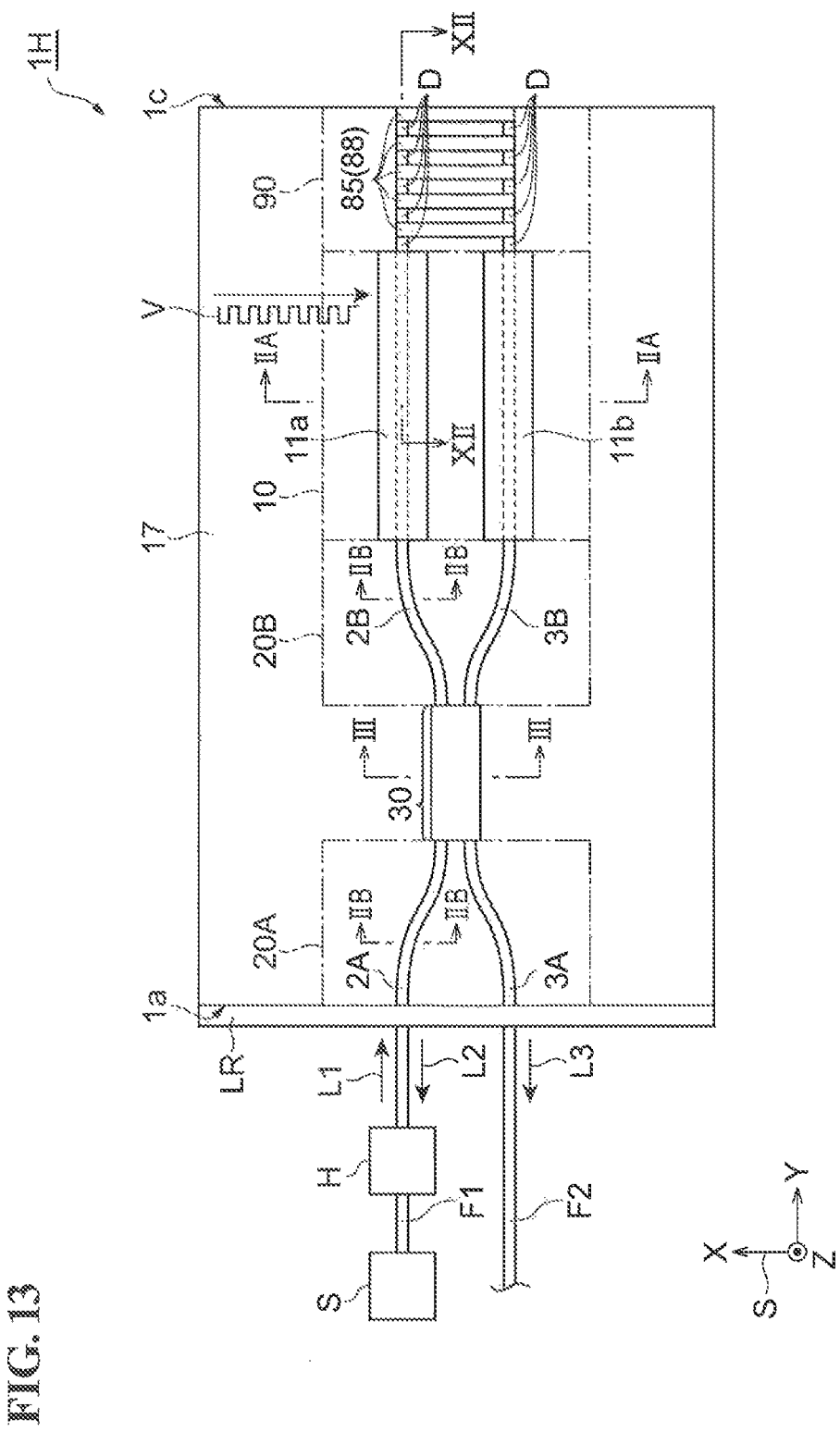
FIG. 13 is a plan view showing Modification Example 7 of a Mach-Zehnder interferometer type optical modulator.

Modification Example 7 of the Mach-Zehnder interferometer type optical modulator 1A described above will now be described. FIG. 13 is a plan view showing Modification Example 7 of a Mach-Zehnder interferometer type optical modulator. FIG. 12 is also a cross-sectional view of the Mach-Zehnder interferometer type optical modulator shown in FIG. 13 taken along line XII-XII.

A Mach-Zehnder interferometer type optical modulator 1H shown in FIG. 13 differs from the Mach-Zehnder interferometer type optical modulator 1A shown in FIG. 1 in that an end facet ic and a DBR portion 90 including semiconductor portions 88 and dielectric portions D alternately arranged are provided instead of the second end facet 1b and the high-reflection film HR. The optical waveguides 2B and 3B include the DBR portion 90 optically connected to the phase shifting section 10. The DBR portion 90 is the reflecting portion of this modification example. The structure of the DBR portion 90 of Modification Example 7 is basically the same as that of the DBR portion 80 of Modification example 6. However, as shown in FIG. 13, the semiconductor portions 88 are not individually formed in the optical waveguides 2B and 3B but are integrated. Accordingly, the cross-sectional structure of the Mach-Zehnder interferometer type optical modulator 1H is the same as that shown in FIG. 12.

The height of the DBR portion in the direction perpendicular to the semiconductor substrate 4 of the semiconductor portions (Z direction in the drawing) is, for example, 3 to 4 μm and the width thereof in the waveguiding direction (Y direction in the drawing) is several hundred nanometers, which is relatively small. When the semiconductor portions 88 of the optical waveguide 2B are separately formed from the semiconductor portions 88 of the optical waveguide 3B as in Modification Example 6, the mechanical strength of the DBR portion is low. In contrast, according to the structure of Modification Example 7, the semiconductor portions of the optical waveguide 2B are integrated with the semiconductor portions of the optical waveguide 3B, and thus the width in the direction (X direction in the drawing) perpendicular to the waveguiding direction (Y direction in the drawing) is increased. Thus, the mechanical strength of the DBR portion can be improved.

MODIFICATION EXAMPLE 8

Figure 14:
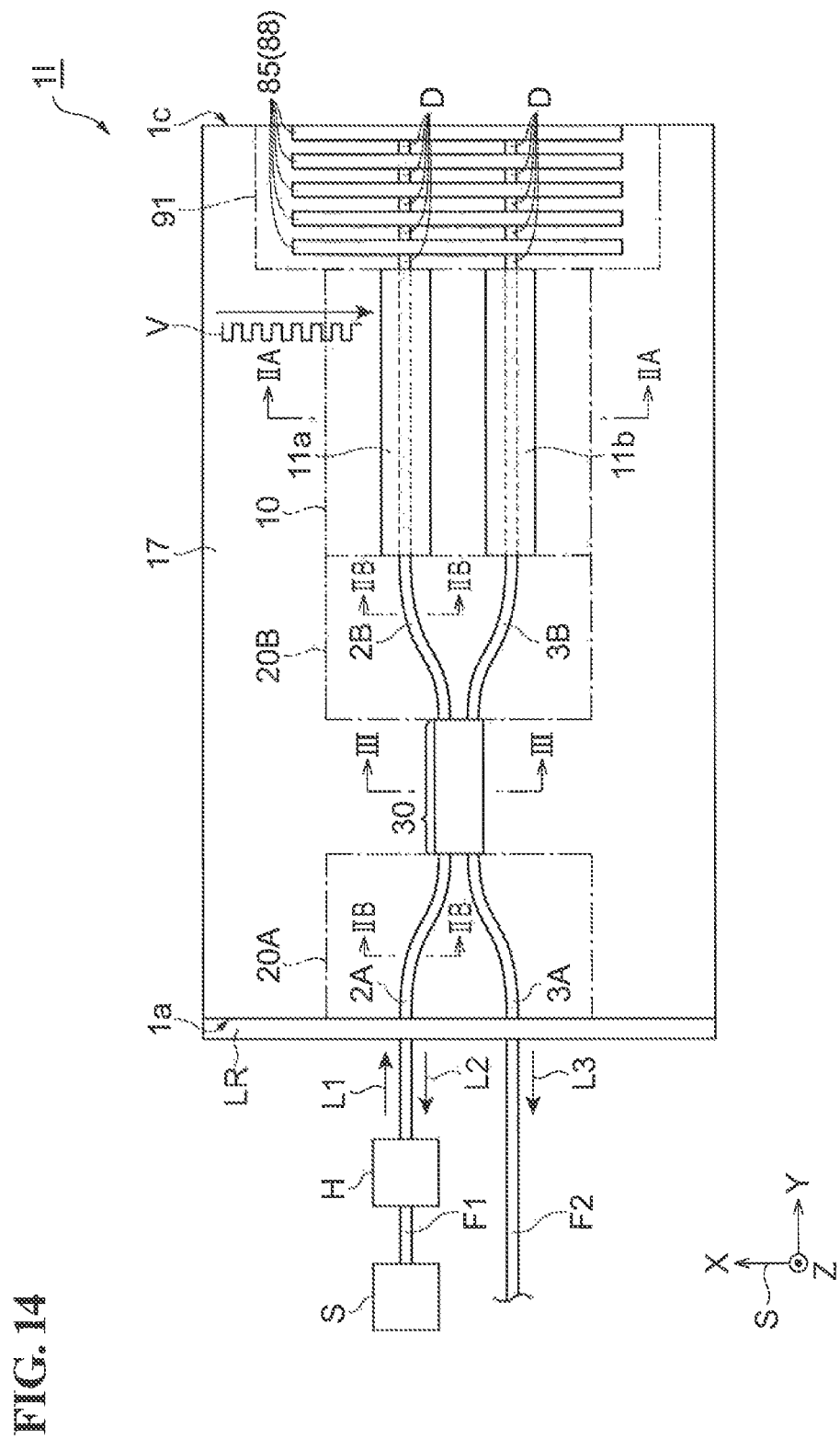
FIG. 14 is a plan view showing Modification Example 8 of a Mach-Zehnder interferometer type optical modulator.

Modification Example 8 of the Mach-Zehnder interferometer type optical modulator 1A described above will now be described. FIG. 14 is a plan view showing Modification Example 8 of a Mach-Zehnder interferometer type optical modulator.

A Mach-Zehnder interferometer type optical modulator 1I shown in FIG. 14 differs from the Mach-Zehnder interferometer type optical modulator 1A shown in FIG. 1 in that the optical waveguides 2B and 3B further include a DBR portion 91 between the phase shifting section 10 and the second end facet Ic, the DBR portion 91 including alternately arranged semiconductor portions 88 and dielectric portions D. The DBR portion 91 is a reflecting portion of this modification example. The structure of the DBR portion 91 of Modification Example 8 is basically the same as that of the DBR portion 90 of Modification example 7. However, as shown in FIG. 14, the DBR portion 91 of Modification Example 8 has semiconductor portions 88 that extend beyond the optical waveguides 2B and 3B in the direction (X direction in the drawing) perpendicular to the waveguiding direction (Y direction in the drawing). According to the structure of Modification Example 8, the width of the semiconductor portions in the X direction is larger than that of Modification Example 7. Thus, the mechanical strength of the DBR portion can be further enhanced.

MODIFICATION EXAMPLE 9

Figure 15:
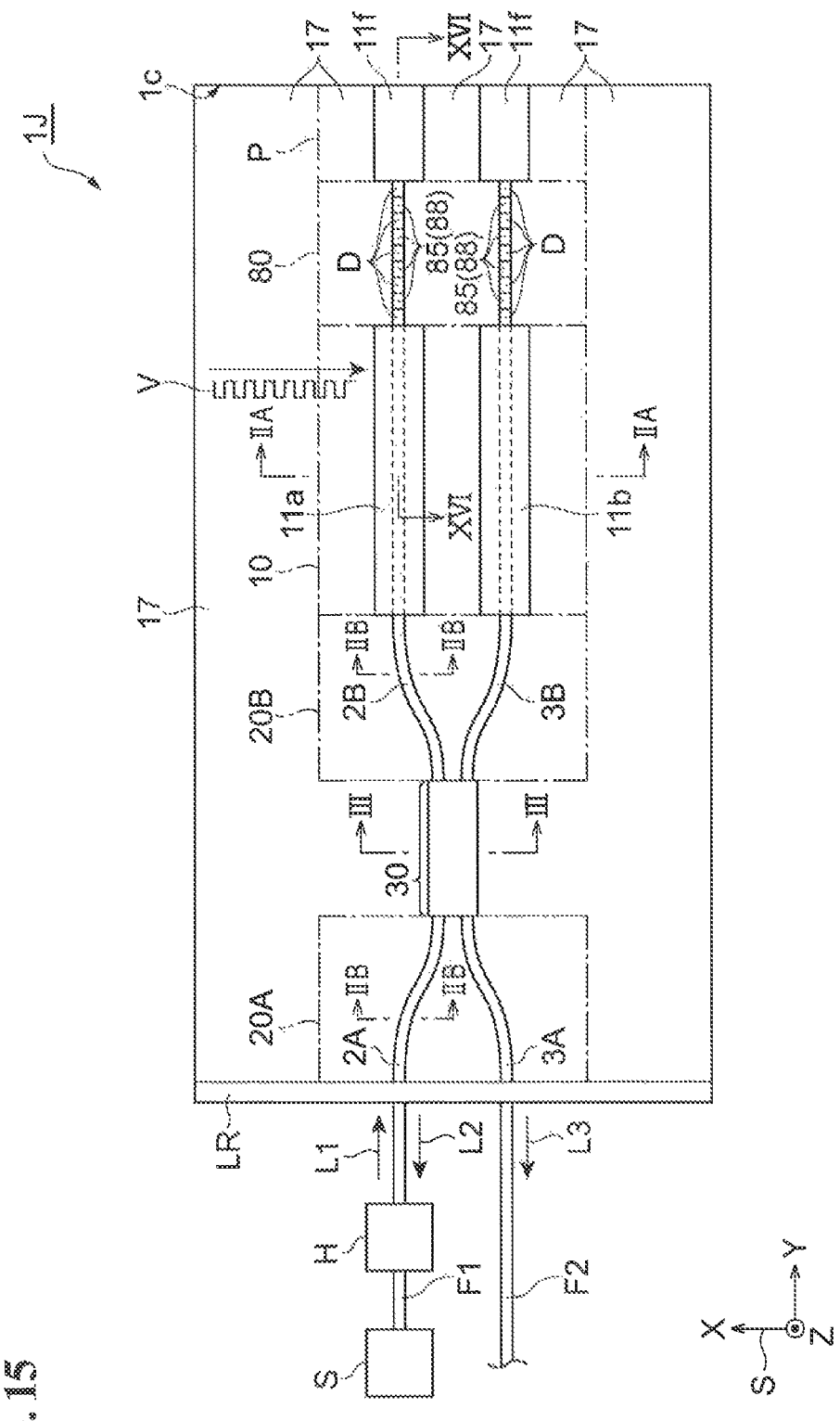
FIG. 15 is a plan view showing Modification Example 9 of a Mach-Zehnder interferometer type optical modulator.
Figure 16:
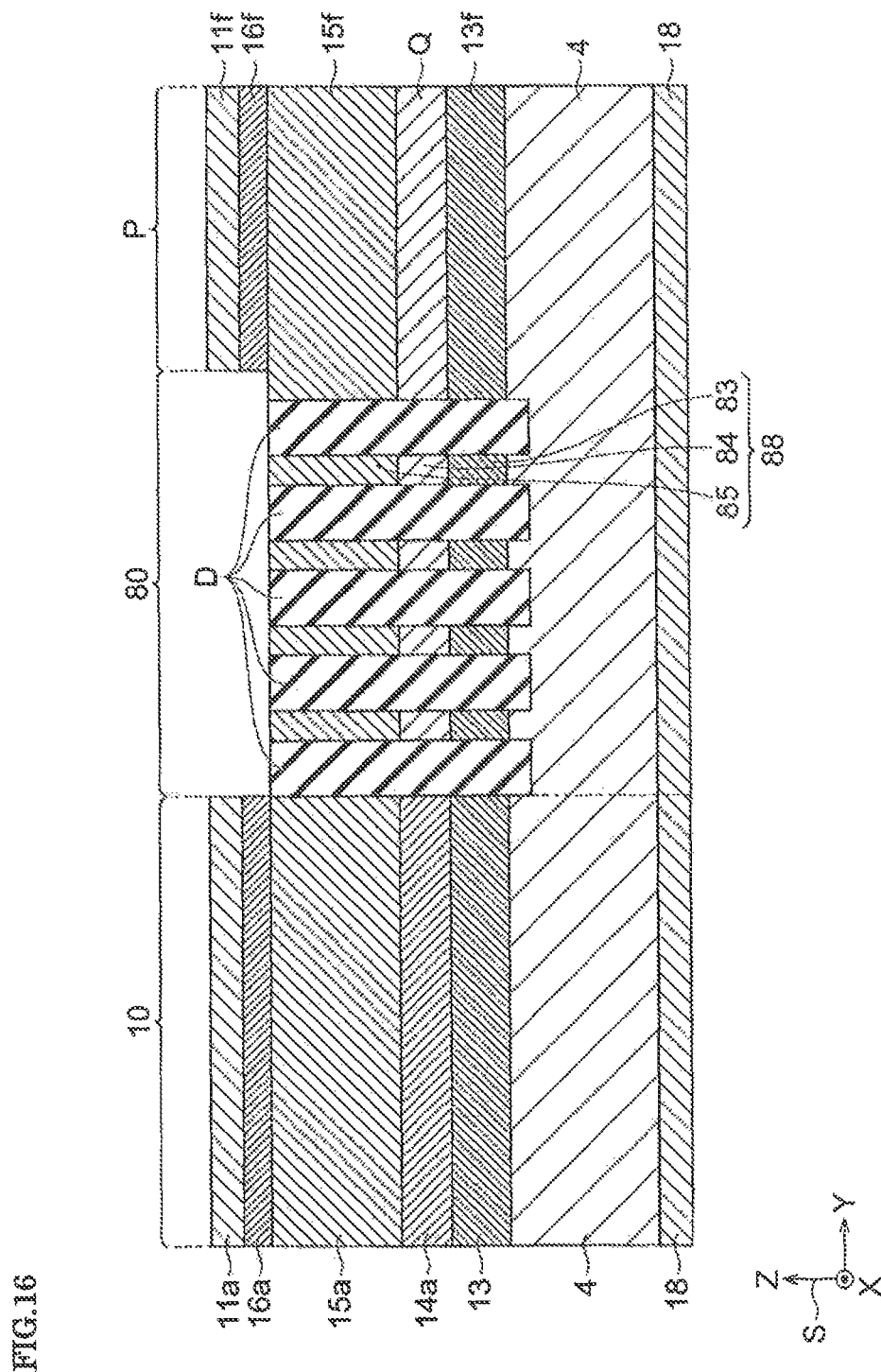
FIG. 16 is a cross-sectional view of the Mach-Zehnder interferometer type optical modulator taken along line XVI-XVI.
Figure 17:
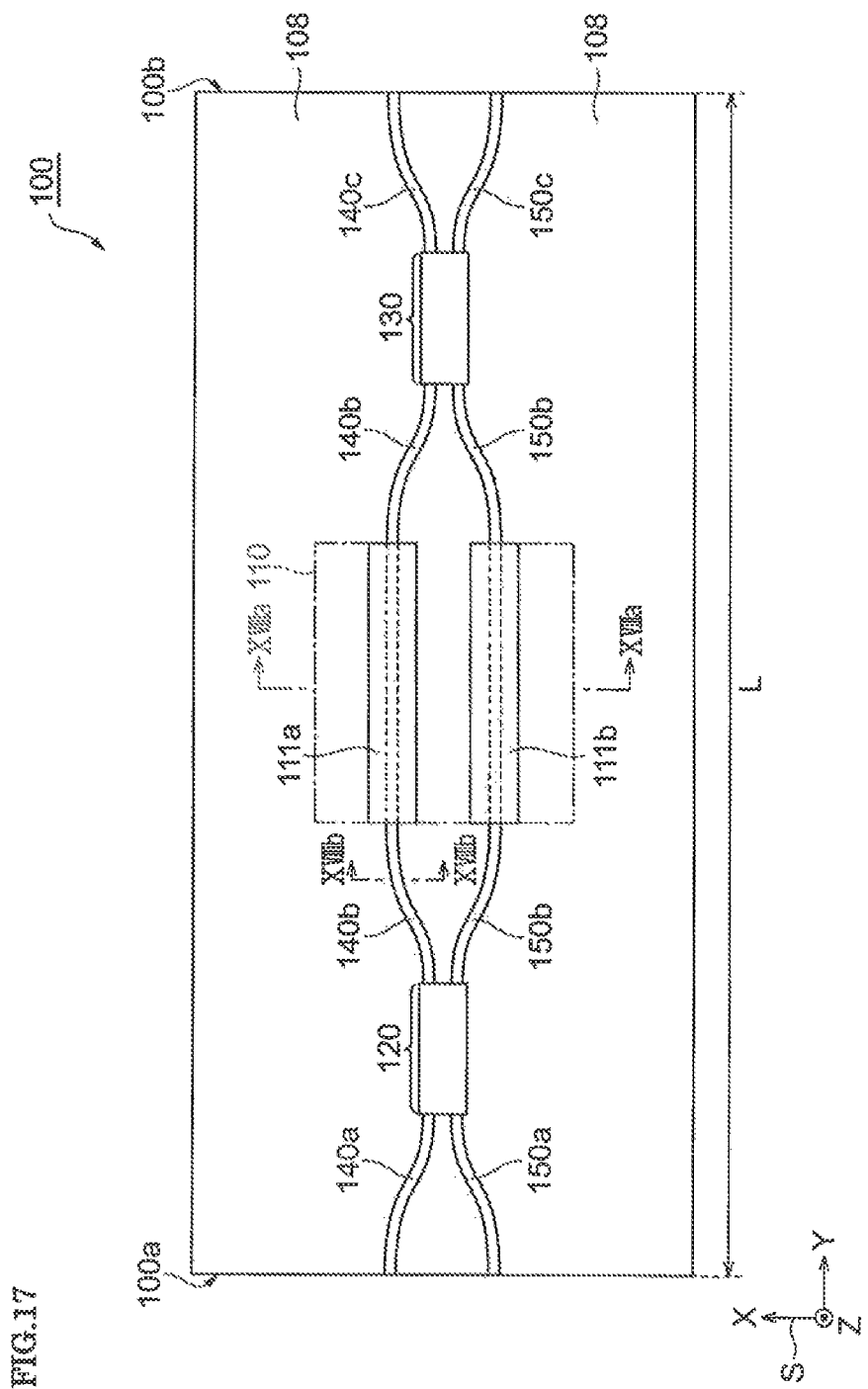
FIG. 17 is a plan view showing one example of an existing Mach-Zehnder interferometer type optical modulator.
Figure 18A:
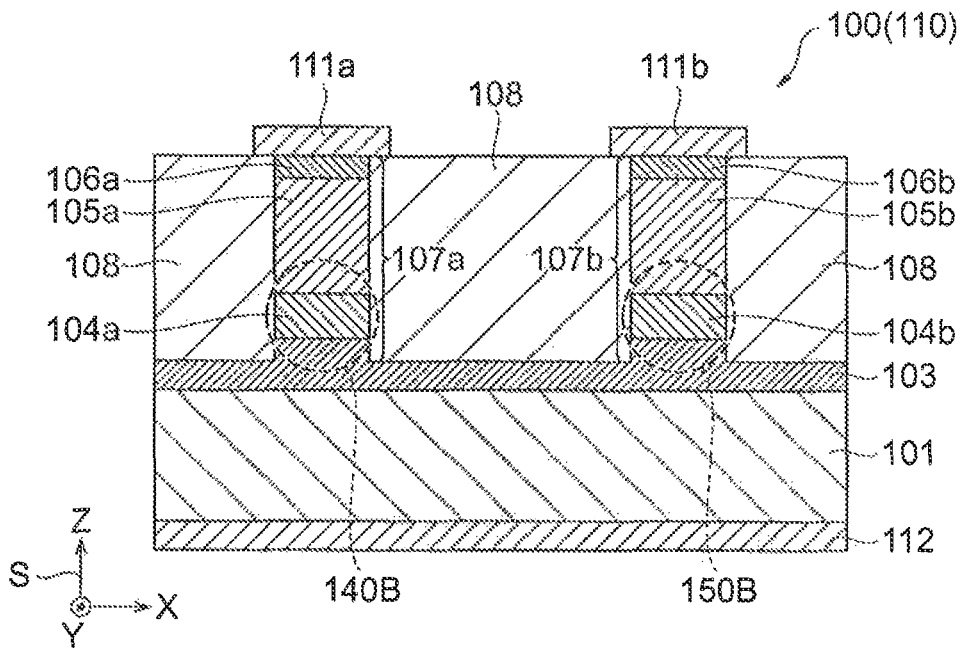
FIG. 18A is a cross-sectional view taken along line XVIIIa-XVIIIa in FIG. 17
Figure 18B:
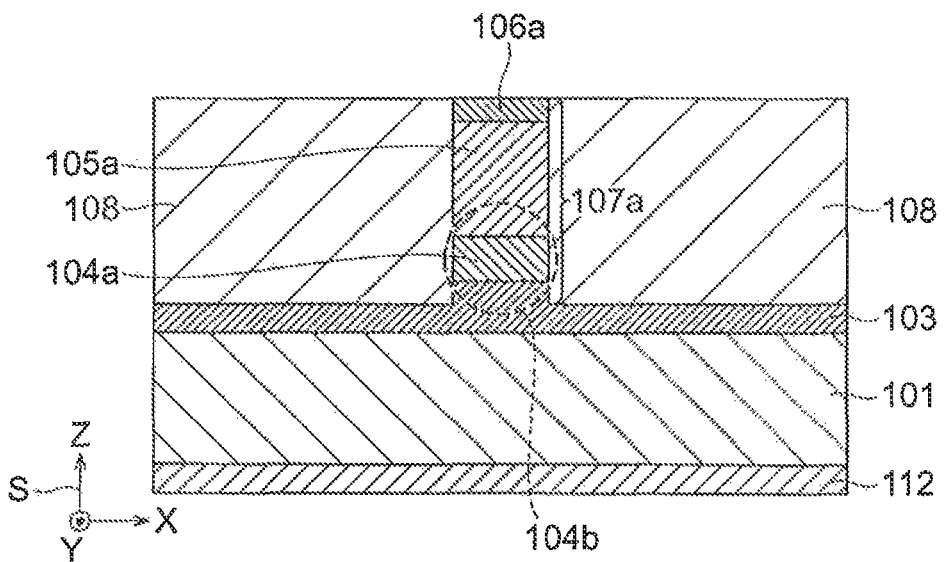
FIG. 18B is a cross-sectional view taken along line XVIIIb-XVIIIb in FIG. 17.

Modification Example 9 of the Mach-Zehnder interferometer type optical modulator 1A described above will now be described. FIG. 15 is a plan view showing Modification Example 9 of a Mach-Zehnder interferometer type optical modulator. FIG. 16 is a cross-sectional view of the Mach-Zehnder interferometer type optical modulator shown in FIG. 15 taken along line XVI-XVI.

A Mach-Zehnder interferometer type optical modulator 1J shown in FIGS. 15 and 16 differs from the Mach-Zehnder interferometer type optical modulator 1A shown in FIG. 1 in that the optical waveguides 2B and 3B further include a DBR portion 80 and an optical detection region P between the phase shifting section 10 and the second end facet Ic. The optical detection region P has a function of monitoring guided light. The optical detection region P is disposed between the DBR portion 80 and the second end facet Ic. The DBR portion 80 of Modification Example 9 may be the DBR portion 80 of Modification Example 6. The DBR portion 80 is the reflecting portion according to this modification example.

As shown in FIG. 16, the optical detection region P is joined to the DBR portion 80 by a butt joint method. A lower cladding layer 13f, a light-absorbing layer Q, an upper cladding layer 15f, a contact layer 16f, and an electrode 11f are stacked on the semiconductor substrate 4 in that order in the optical detection region P. The light-absorbing layer Q may be composed of a material that can be used to form the first core layer 14a of the phase shifting section 10. A material having a band gap energy that can absorb the light emitted from the DBR portion 80 is used in the light-absorbing layer Q.

Most of the guided light input to the Mach-Zehnder interferometer type optical modulator 1J from the first end facet 1a is reflected by the DBR portion 80 toward the first end facet 1a side. However, the rest of the light passes through the DBR portion 80 and enters the optical detection region P. The light that has entered the optical detection region P is absorbed with the light-absorbing layer Q and converted into a photocurrent. Since the photocurrent is proportional to the power of the guided light, the optical detection region P can be used as a power monitor for the guided light.

In Modification Example 9, a structure in which the optical detection region P is jointed with the DBR portion 80 by the butt joint method is shown. Alternatively, the DBR portion may be the same as the DBR portion 70 of Modification Example 5, the DBR portion 90 of Modification Example 7, or the DBR portion 91 of Modification Example 8.

Although the principle of the present invention has been described through preferred embodiments above, persons skilled in the art would naturally recognize that modifications and alterations of details are possible without departing from the principle of the present invention. Accordingly, the scope of the protection shall be extended to all modifications and alterations within the scope of the claims and the spirit thereof.

What is claimed is:

1. A Mach-Zehnder interferometer type optical modulator comprising:
   a first end facet and a reflecting portion opposing the first end facet;
   a single optical coupler including input ports and output ports, the optical coupler being disposed between the first end facet and the reflecting portion;
   a first optical waveguide and a second optical waveguide that extend from the first end facet and are connected to the input ports of the optical coupler;
   a third optical waveguide and a fourth optical waveguide that extend from the reflecting portion and are connected to the output ports of the optical coupler; and
   a phase shifting section that controls the phase of light propagating in at least one of the third and the fourth optical waveguides, the phase shifting section being disposed between the optical coupler and the reflecting portion, wherein the phase shifting section includes a first optical waveguide structure constituting a part of the third optical waveguide, a first upper electrode on the first optical waveguide structure, a second optical waveguide structure constituting a part of the fourth optical waveguide, and a second upper electrode on the second optical waveguide structure, the reflecting portion includes a plurality of distributed Bragg reflectors, each distributed Bragg reflector being optically connected to the third optical waveguide or the fourth optical waveguide, the distributed Bragg reflectors each include a diffraction grating structure including a plurality of semiconductor portions and a plurality of dielectric portions periodically and alternately arranged in a waveguiding direction, and the semiconductor portions of the distributed Bragg reflectors are integrally formed with each other, and the semiconductor portions of at least one of the distributed Bragg reflectors that is optically connected to the third optical waveguide are connected to the semiconductor portions of at least one of the distributed Bragg reflectors that is optically connected to the fourth optical waveguide.

2. The Mach-Zehnder interferometer type optical modulator according to claim 1, wherein the first optical waveguide structure in the phase shifting section includes a first lower cladding layer, a first core layer and a first upper cladding layer, the second optical waveguide structure in the phase shifting section includes a second lower cladding layer, a second core layer and a second upper cladding layer, the first upper electrode is disposed on the first upper cladding layer of the first optical waveguide structure, and the second upper electrode is disposed on the second upper cladding layer of the second optical waveguide structure.

3. The Mach-Zehnder interferometer type optical modulator according to claim 1, wherein the optical coupler is a multimode interference coupler including two input ports and two output ports which are a through port and a cross port, respectively, and the optical coupler is configured so that the phase of guided light propagating from one of the input ports to the cross port is delayed by $\pi/2$ with respect to the phase of guided light propagating from said one input port to the through port.

4. The Mach-Zehnder interferometer type optical modulator according to claim 1, further comprising:

a phase adjusting section that adjusts the phase of light propagating in at least one of the third and the fourth optical waveguides independently from the phase shifting section, the phase adjusting section being disposed between the phase shifting section and the optical coupler, wherein the phase adjusting section includes:

a third optical waveguide structure constituting a part of the third optical waveguide;

a third upper electrode disposed on the third optical waveguide structure;

a fourth optical waveguide structure constituting a part of the fourth optical waveguide; and a fourth upper electrode disposed on the fourth optical waveguide structure.

5. The Mach-Zehnder interferometer type optical modulator according to claim 1, further comprising:

a plurality of monitoring portions respectively connected to the distributed Bragg reflectors, wherein the monitoring portions include photo-receiving elements that convert light output from the distributed Bragg reflectors into electrical signals.

6. The Mach-Zehnder interferometer type optical modulator according to claim 1, wherein the plurality of dielectric portions of the distributed Bragg reflectors are composed of benzocyclobutene resin or polyimide resin.

7. The Mach-Zehnder interferometer type optical modulator according to claim 1, wherein the first end facet includes an anti-reflection film formed thereon.

8. The Mach-Zender interferometer type optical modulator according to claim 1, wherein the semiconductor portions of the at least one distributed Bragg reflector connected to the third optical waveguide extend to the semiconductor portions of the at least one distributed Bragg reflector connected to the fourth optical waveguide in a direction intersecting the waveguiding direction.

* * * * *